(12) United States Patent
Valadas et al.

(10) Patent No.: US 9,379,495 B2
(45) Date of Patent: Jun. 28, 2016

(54) ELECTRICAL OUTLET PROVIDED WITH IDENTIFICATION MEANS, AND ASSOCIATED ELECTRICAL PLUG AND ELECTRICAL ASSEMBLY

(75) Inventors: Vincent Valadas, Ambazac (FR); Jean-Luc Chaumeny, Solignac (FR)

(73) Assignees: LEGRAND FRANCE, Limoges (FR); LEGRAND SNC, Limoges (FR)

( * ) Notice: Subject to any disclaimer, the term of this patent is extended or adjusted under 35 U.S.C. 154(b) by 49 days.

(21) Appl. No.: 14/127,742

(22) PCT Filed: May 15, 2012

(86) PCT No.: PCT/FR2012/000197
§ 371 (c)(1),
(2), (4) Date: Dec. 19, 2013

(87) PCT Pub. No.: WO2013/001174
PCT Pub. Date: Jan. 3, 2013

(65) Prior Publication Data
US 2014/0120764 A1    May 1, 2014

(30) Foreign Application Priority Data

Jun. 29, 2011    (FR) ..................... 11 02016

(51) Int. Cl.
*H01R 13/66* (2006.01)
*G02B 6/38* (2006.01)
(Continued)

(52) U.S. Cl.
CPC ............ *H01R 13/66* (2013.01); *B60L 11/1818* (2013.01); *G02B 6/3817* (2013.01);
(Continued)

(58) Field of Classification Search
CPC .... H01R 29/00; H01R 13/7039; H01R 13/64; H01R 13/6683; H01R 13/6691; H01R 13/665; H01R 13/465
USPC .......................................... 439/488, 489, 955
See application file for complete search history.

(56) References Cited

U.S. PATENT DOCUMENTS 4,898,079 A * 2/1990 Combette ........... F15B 15/2892
200/82 E
5,222,164 A * 6/1993 Bass, Sr. ............ H01R 13/6683
250/208.2
(Continued)

FOREIGN PATENT DOCUMENTS

DE    10 2007 060643 A1    6/2009
EP    0 448 084 A1    9/1991
(Continued)

OTHER PUBLICATIONS

International Search Report, dated Aug. 9, 2012, from corresponding PCT application.

*Primary Examiner* — Abdullah Riyami
*Assistant Examiner* — Justin Kratt
(74) *Attorney, Agent, or Firm* — Young & Thompson

(57) ABSTRACT

A socket outlet (100A; 100B; 100C; 100D) presenting given intrinsic characteristics so as to be suitable for delivering continuously, and without being damaged, an electrical signal that presents a determined maximum current, includes identification elements (130A; 130B; 130C; 130D) that are adapted to communicate or to co-operate with an electric plug (200A; 200B; 200C; 200D) so as to generate a pilot signal that is representative of the maximum current of the electrical signal that can be delivered by the socket outlet without being damaged. An electric plug and an electrical assembly are also described.

21 Claims, 14 Drawing Sheets

(51) Int. Cl.
*H01R 13/717* (2006.01)
*B60L 11/18* (2006.01)
*H01R 13/46* (2006.01)
*H01R 13/703* (2006.01)
*H01R 13/64* (2006.01)
*H01R 24/30* (2011.01)
*H01R 24/76* (2011.01)
*H01R 103/00* (2006.01)
*H01R 105/00* (2006.01)

(52) U.S. Cl.
CPC .......... *G02B6/3895* (2013.01); *H01R 13/6608* (2013.01); *H01R 13/6641* (2013.01); *H01R 13/6683* (2013.01); *H01R 13/6691* (2013.01); *H01R 13/703* (2013.01); *H01R 13/7031* (2013.01); *H01R 13/7035* (2013.01); *H01R 13/717* (2013.01); *H01R 13/7175* (2013.01); *B60L 2270/32* (2013.01); *B60L 2270/34* (2013.01); *H01R 13/465* (2013.01); *H01R 13/64* (2013.01); *H01R 13/665* (2013.01); *H01R 13/7039* (2013.01); *H01R 24/30* (2013.01); *H01R 24/76* (2013.01); *H01R 2103/00* (2013.01); *H01R 2105/00* (2013.01); *Y02T 10/7005* (2013.01); *Y02T 10/7072* (2013.01); *Y02T 90/14* (2013.01); *Y02T 90/16* (2013.01)

(56) References Cited

U.S. PATENT DOCUMENTS

| | | | |
|---|---|---|---|
| 5,413,493 A * | 5/1995 | Hoffman | B60L 11/1818 200/51.09 |
| 7,329,128 B1 | 2/2008 | Awad | |
| 2007/0093142 A1* | 4/2007 | MacDonald | A61N 1/056 439/676 |
| 2009/0192927 A1* | 7/2009 | Berg | G06Q 30/04 705/34 |

FOREIGN PATENT DOCUMENTS

| | | | | |
|---|---|---|---|---|
| EP | 2 230 729 A1 | | 9/2010 | |
| EP | 2230729 A1 | * | 9/2010 | |
| FR | 2 949 280 A1 | | 2/2011 | |
| KR | 2002-0080766 | | 10/2002 | |
| KR | 20020080766 A | * | 10/2002 | ............ H01R 11/30 |
| WO | 2007/072581 A1 | | 6/2007 | |
| WO | 2009/125838 A1 | | 10/2009 | |

* cited by examiner

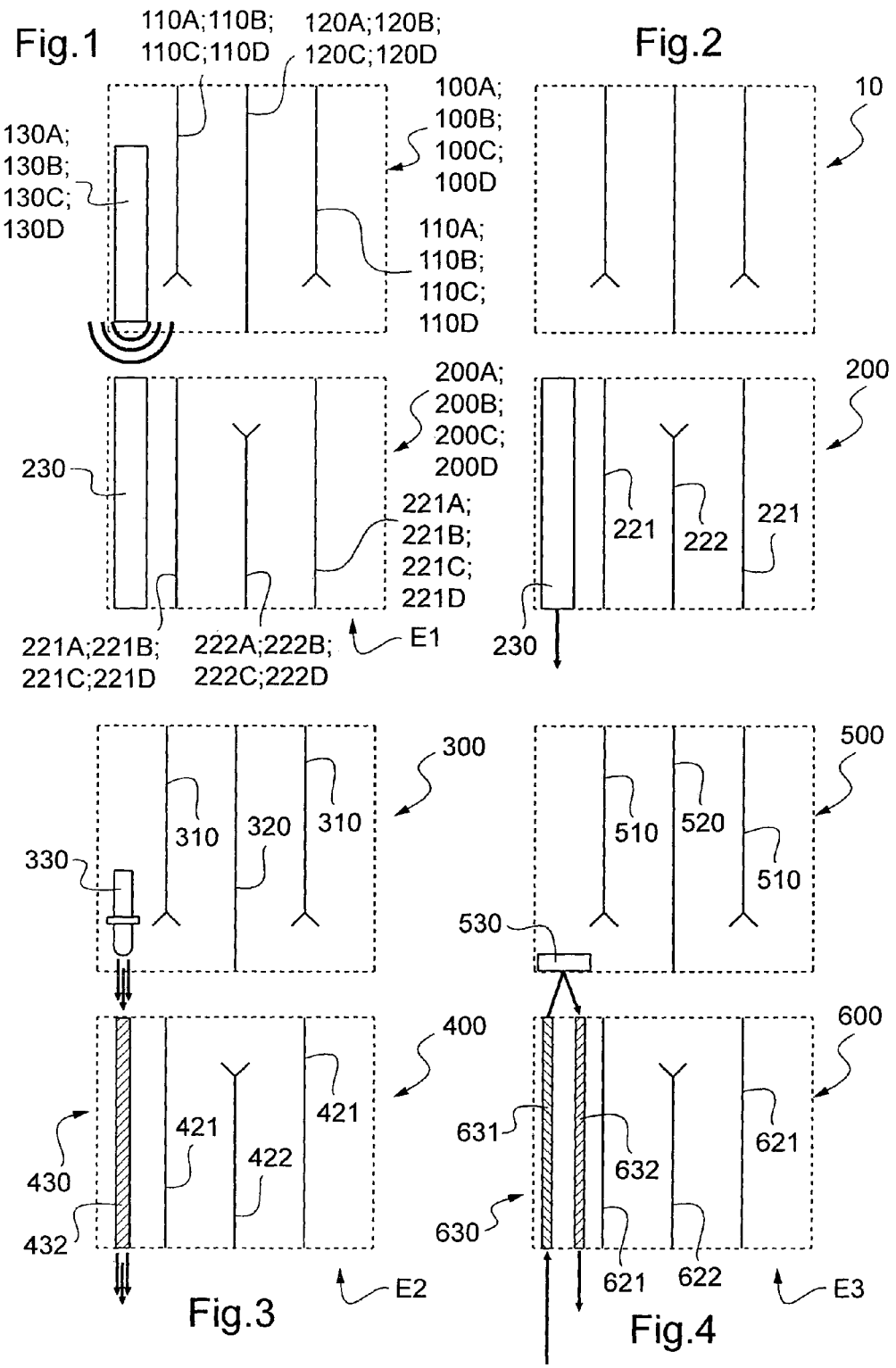

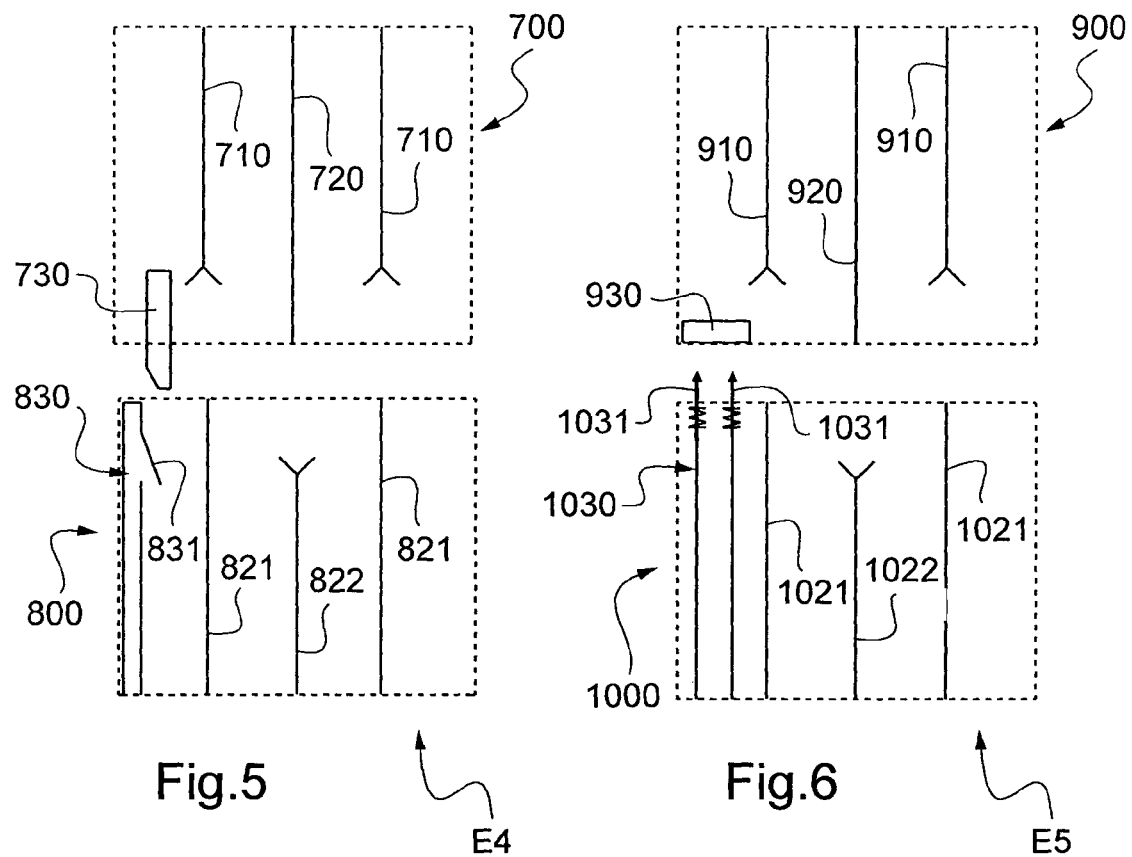

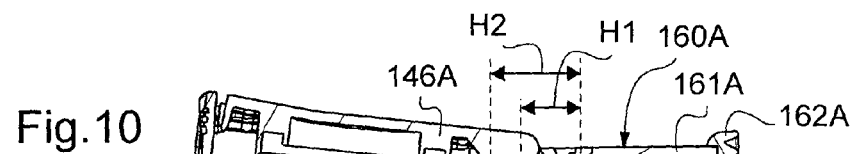
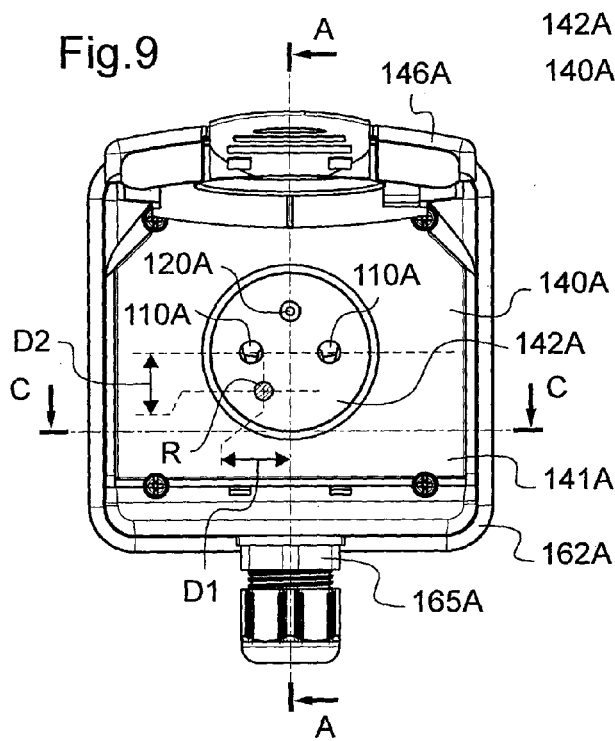
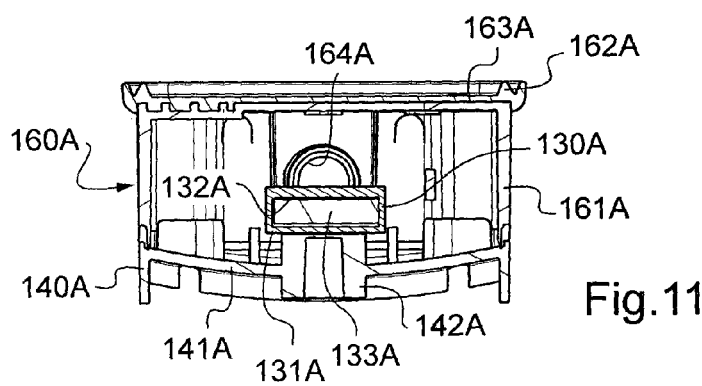

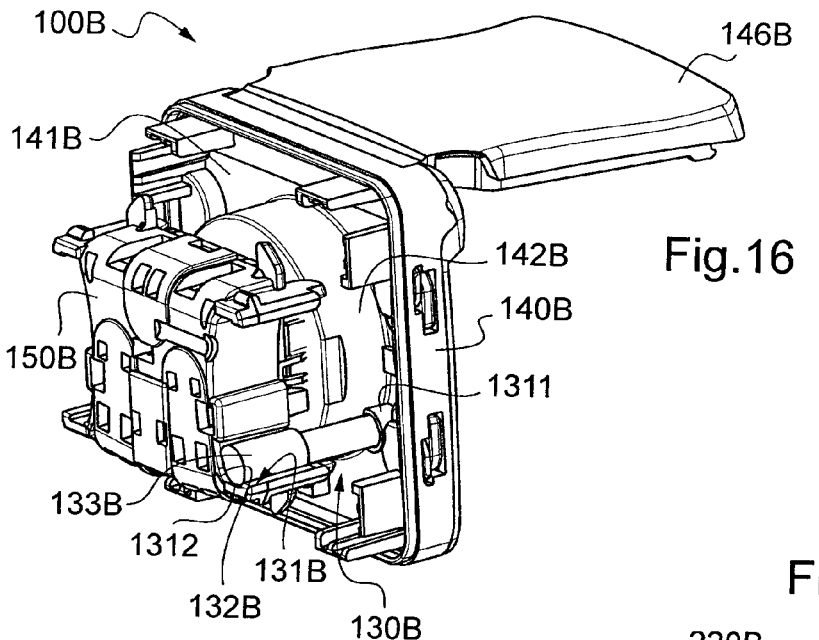
Fig.16
Fig.15
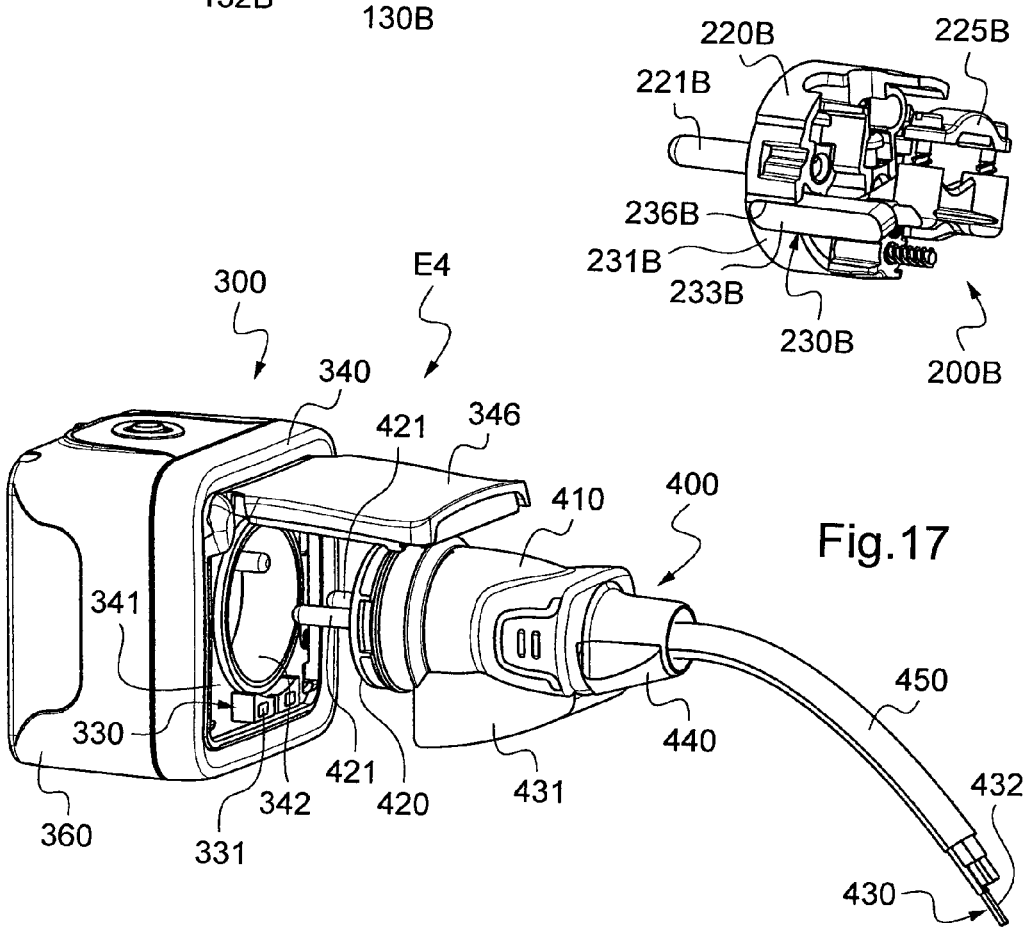
Fig.17

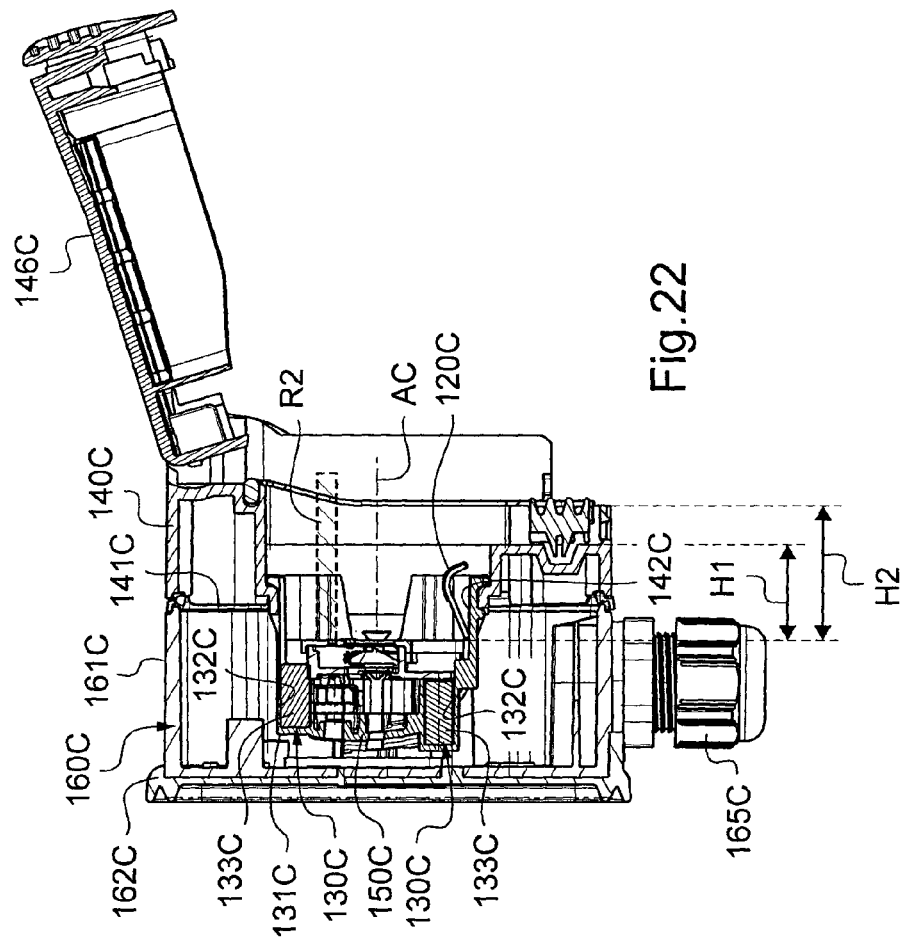
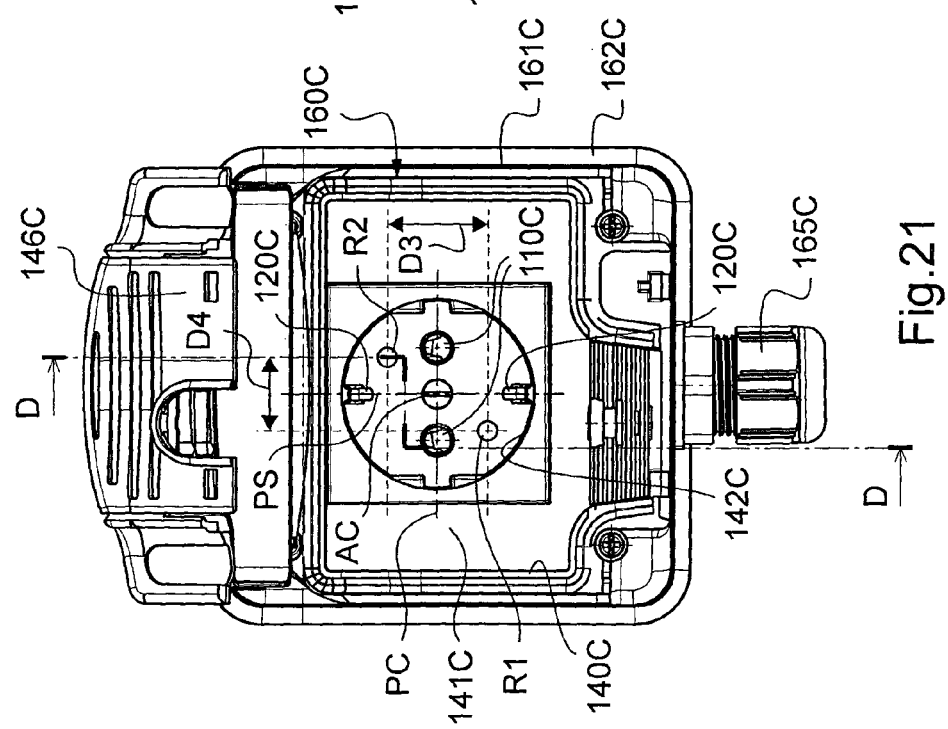

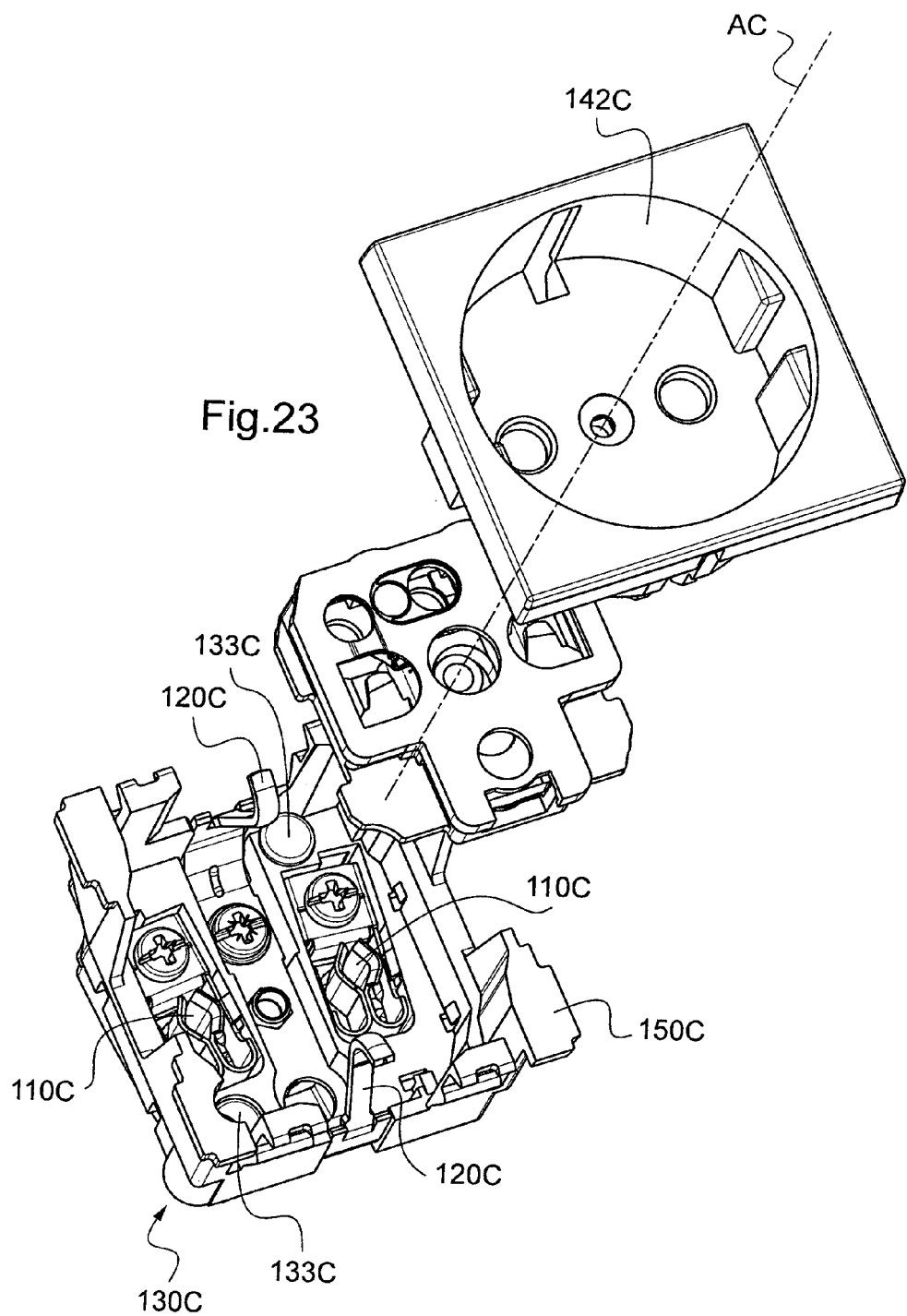

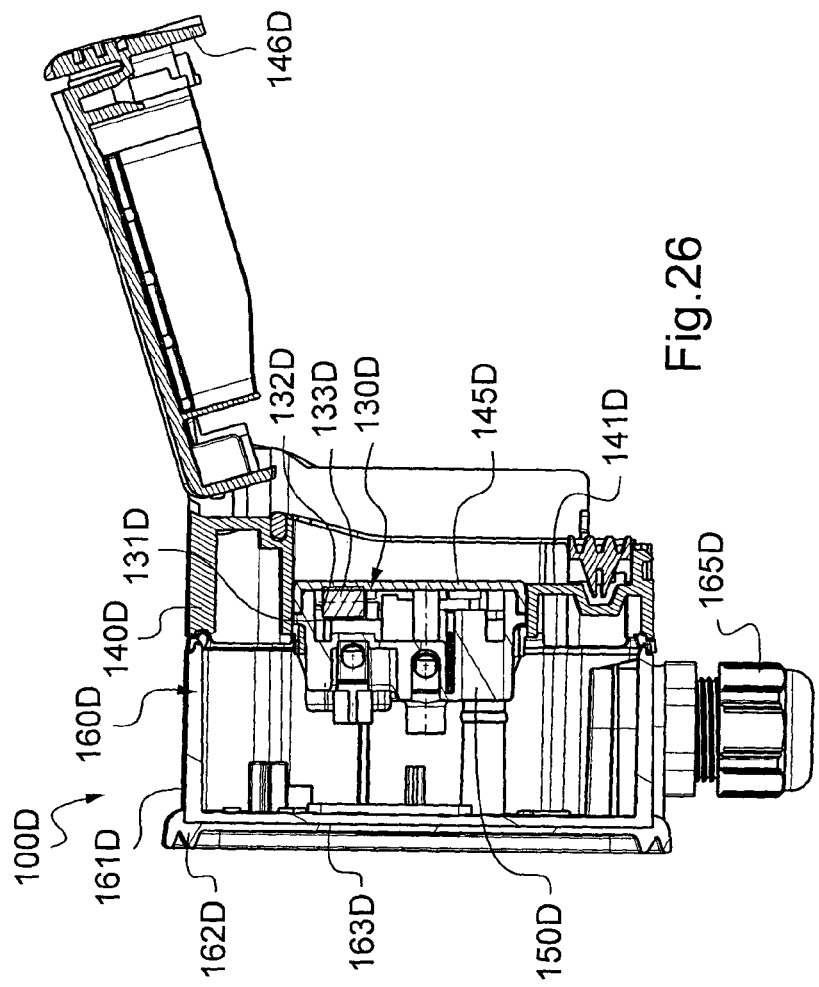
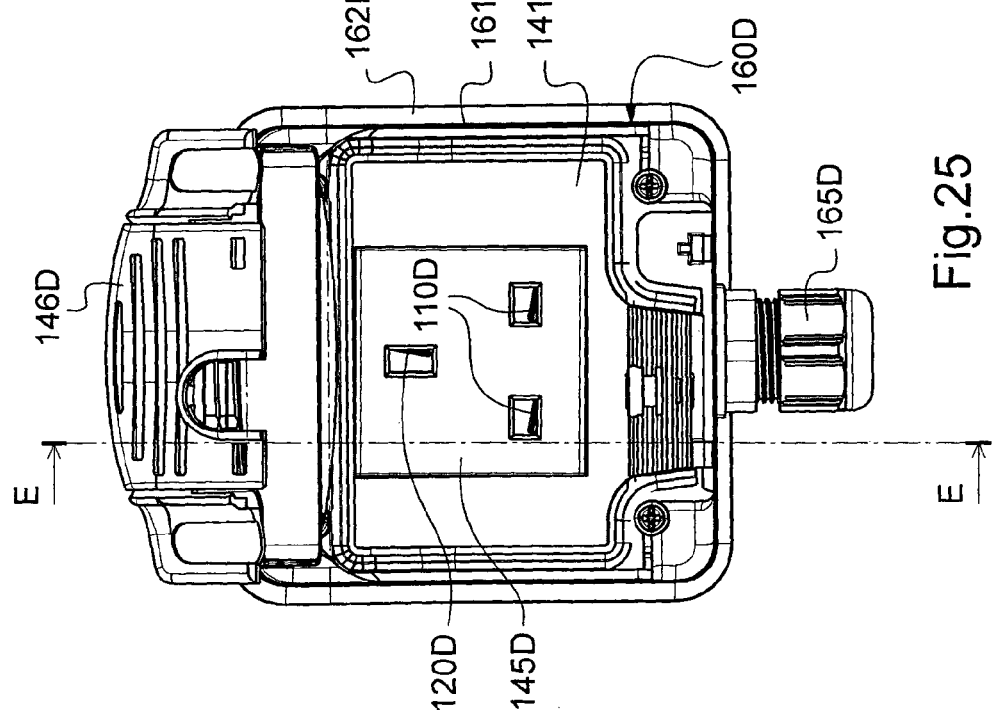

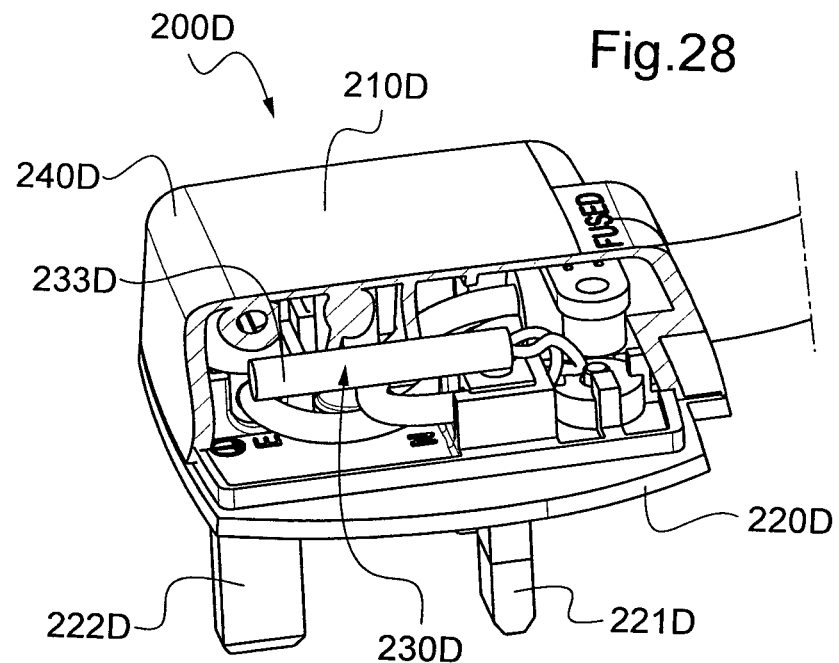
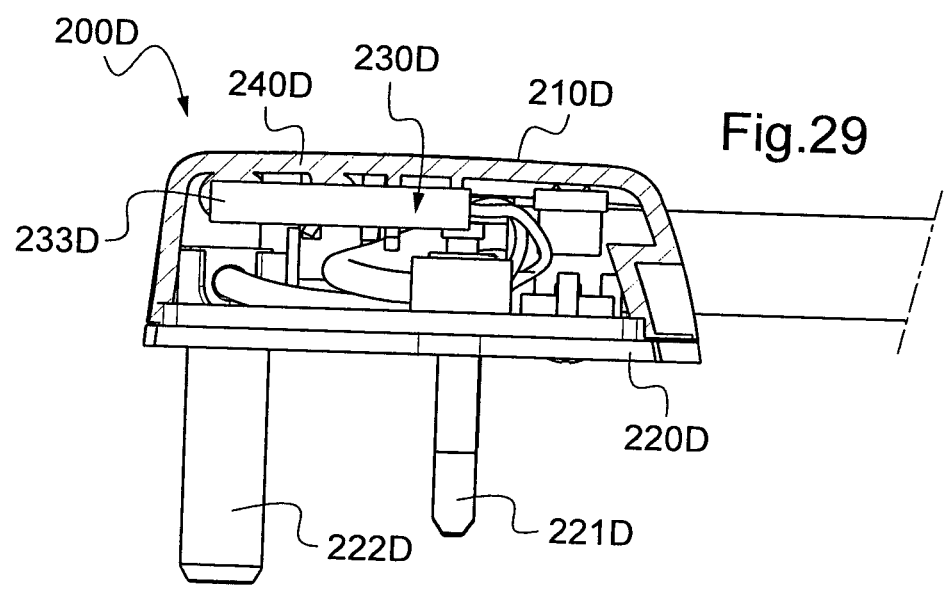

US 9,379,495 B2

ELECTRICAL OUTLET PROVIDED WITH IDENTIFICATION MEANS, AND ASSOCIATED ELECTRICAL PLUG AND ELECTRICAL ASSEMBLY

TECHNICAL FIELD TO WHICH THE INVENTION RELATES

The present invention generally relates to the field of socket outlets.

It relates more particularly to the field of socket outlets presenting given intrinsic characteristics so as to be suitable for delivering continuously, and without being damaged, an electrical signal that depends on the intrinsic characteristics of the socket outlet and that presents a determined maximum current.

The invention finds a particularly advantageous application in providing a socket outlet that is dedicated to charging a battery of an electric motor vehicle, and that delivers a maximum current that is equal to 16 amps (A).

It also relates to the field of electric plugs and of electrical assemblies, each comprising a socket outlet and an electric plug.

TECHNOLOGICAL BACKGROUND

Charging the battery of a motor vehicle requires the battery to pass a current that is typically equal to 14 A, and to do so for several hours.

For practical reasons, it is thus advantageous for the user to plug the battery of the motor vehicle into a standard domestic socket outlet that is standardized for 16 A.

Theoretically, that type of socket outlet presents intrinsic characteristics that enable it to deliver a current that is less than or equal to 16 A for a standardized duration.

However, that type of socket outlet satisfies standard requirements that are defined for ordinary domestic uses for which the current delivered is usually less than 14 A or 16 A, with the socket outlet being used at periodicities and for durations that are less than the periodicities and the durations that are necessary for charging the battery of a motor vehicle.

Furthermore, in practice, the intrinsic characteristics of the socket outlets installed in the homes of users may vary from one socket outlet to another, and may also vary over time. It is impossible to know such characteristics with certainty.

It is also possible that the user is confronted with a socket outlet that does not comply with the standard.

Such uncertainty concerning the intrinsic characteristics of socket outlets, and thus concerning suitability for delivering a current of 14 A or more for several hours, and in regular manner, is not acceptable since it jeopardizes the safety of people and of installations.

A novel domestic application such as charging an electric vehicle may stress socket outlets to the limits of standard characteristics, and consequently requires accurate knowledge of the type and of the quality of the socket outlet used in order to take advantage of the maximum capacities of the socket outlet without damaging it, and in particular to take advantage of the maximum current that the socket outlet is adapted to deliver continuously without being damaged.

The socket outlet described in document FR 2 943 468 provides a first response to that problem in that it includes identification means for supplying the user with a pilot signal that is representative of data about the appliance plugged into the socket outlet. The pilot signal is a light signal that informs the user that the socket outlet is not suitable for use with the appliance.

A drawback of that socket outlet is that it cannot give information directly to the appliance that is plugged therein about the electrical signal delivered by the socket outlet.

The appliance thus cannot adapt its operation to the socket outlet to which it is plugged.

Furthermore, the safety of the installations and of the people is not guaranteed since an inattentive user may plug an unsuitable appliance to the socket outlet.

Documents FR 2 949 280 and WO 2007/072581 disclose electrical assemblies each comprising a socket outlet and an electric plug including means that enable the socket outlet to recognize the plug so as to allow the electrical signal to pass from the socket outlet to the plug.

Documents EP 2 230 729 and EP 0 448 084 also disclose electrical assemblies each comprising a socket outlet and an electric plug including means that enable the socket outlet to recognize an absence of contact or an electrical contact fault between the socket outlet and its associated plug.

However, none of the assemblies enable the socket outlet to generate a signal that informs the electric plug about the maximum current that the socket outlet is adapted to deliver without being damaged.

OBJECT OF THE INVENTION

In order to remedy the above-mentioned drawback of the prior art, the present invention proposes a novel type of socket outlet that is adapted to communicate with the electric plug of the electrical appliance that is connected to the socket outlet.

More particularly, the invention proposes a socket outlet as defined above, including identification means that are adapted to communicate or to co-operate with an electric plug so as to generate a pilot signal that is representative of the maximum current of the electrical signal that can be delivered by the socket outlet without being damaged.

Thus, the socket outlet communicates or co-operates directly with the electric plug that is connected thereto so as to supply said plug with a pilot signal that it can forward to the electrical appliance to enable said electrical appliance to modify its operation as a function of the maximum current of the electrical signal that can be delivered by the socket outlet without said socket outlet being damaged.

The pilot signal is determined as a function of the electrical signal that can be delivered by the socket outlet. The electrical signal that can be delivered depends on the maximum current that the socket outlet can deliver without being damaged, but it may also depend on other intrinsic characteristics of the socket outlet that are described in greater detail below.

The socket outlet of the invention has other characteristics that are non-limiting and advantageous, as follows:
  said identification means comprise a magnet;
  said magnet is arranged in the casing of the socket outlet, in the proximity of a wall of the reception well of the socket outlet;
  said identification means comprise a light source;
  said light source comprises a light-emitting diode;
  said identification means comprise a light guide;
  said identification means comprise a light reflector;
  said light reflector element is a mirror;
  said identification means comprise a pusher element that is not electrically conductive and that projects from a front portion of the socket outlet; and
  said identification means comprise an additional electrical contact element that is not powered by the socket outlet.

The invention also provides an electric plug that is adapted to be plugged into a socket outlet presenting given intrinsic characteristics so as to be suitable for delivering continuously, and without being damaged, an electrical signal that presents a determined maximum current that depends on the intrinsic characteristics of the socket outlet, and including identification means that are adapted to communicate or to co-operate with the electric plug so as to generate a pilot signal that is representative of said maximum current of the electrical signal that can be delivered by the socket outlet without being damaged, wherein said electric plug includes reader means that are adapted to co-operate with said identification means and to supply said pilot signal to the electric plug.

The electric plug of the invention has other characteristics that are non-limiting and advantageous, as follows:
- said reader means comprise a Hall-effect sensor;
- said reader means comprise a reed switch that is sensitive to magnetic fields;
- said reader means comprise a light detector;
- said reader means comprise a light guide;
- said reader means comprise a light source and a light detector;
- said reader means comprise a mechanical switch of a secondary electrical circuit; and
- said reader means comprise two metal rods that project from the electric plug, and a secondary electrical circuit that is open across the two metal rods.

Finally, the invention provides an electrical assembly comprising a socket outlet and an electric plug that is adapted to be plugged into said socket outlet, the socket outlet presenting given intrinsic characteristics so as to be suitable for delivering continuously, and without being damaged, an electrical signal that presents a determined maximum current that depends on the intrinsic characteristics of the socket outlet, and including identification means that are adapted to communicate or to co-operate with reader means of the electric plug so as to generate a pilot signal that is representative of said maximum current of the electrical signal that can be delivered by the socket outlet without being damaged.

The electrical assembly of the invention has other characteristics that are non-limiting and advantageous, as follows:
- said identification means of the socket outlet comprise a magnet, and said reader means of the electric plug comprise a Hall-effect sensor that is adapted to issue said pilot signal when the electric plug is inserted into said socket outlet;
- said identification means of the socket outlet comprise a magnet, and said reader means of the electric plug comprise a secondary electrical circuit including a reed switch that is sensitive to magnetic fields and that is adapted to change state when the electric plug is inserted into the socket outlet;
- said identification means of the socket outlet comprise a light source, and said reader means of the electric plug comprise a light detector that is adapted to receive the light beam emitted by said light source when the electric plug is inserted into the socket outlet;
- said reader means of the electric plug comprise a light source and a light detector, and said identification means of the socket outlet comprise a light reflector element that is adapted to reflect the light emitted by said light source towards said light detector when the electric plug is inserted into the socket outlet;
- said reader means of the electric plug comprise a secondary electrical circuit that includes a mechanical switch, and said identification means of the socket outlet comprise a pusher element that projects into the reception well of the socket outlet and that is adapted to actuate the switch when the electric plug is inserted into the socket outlet; and
- said reader means of the electric plug comprise a secondary electrical circuit that is open across two metal rods that project from the electric plug, and said identification means of the socket outlet comprise an additional electrical contact element that is adapted to close said secondary electrical circuit when the electric plug is inserted into the socket outlet.

DETAILED DESCRIPTION OF AN EMBODIMENT

The following description of non-limiting examples given with reference to the accompanying drawings, makes it possible to understand what the invention consists of and how it can be reduced to practice.

In the accompanying drawings:

FIG. 1 is a diagrammatic representation of a socket outlet and of an electric plug in accordance with a first embodiment of the invention;

FIG. 2 is a diagrammatic representation of the FIG. 1 electric plug and of a conventional socket outlet;

FIG. 3 is a diagrammatic representation of a socket outlet and of an electric plug in accordance with a second embodiment of the invention;

FIG. 4 is a diagrammatic representation of a socket outlet and of an electric plug in accordance with a third embodiment of the invention;

FIG. 5 is a diagrammatic representation of a socket outlet and of an electric plug in accordance with a fourth embodiment of the invention;

FIG. 6 is a diagrammatic representation of a socket outlet and of an electric plug in accordance with a fifth embodiment of the invention;

FIG. 9 is diagrammatic front view of the FIG. 7 socket outlet;

FIG. 10 is a diagrammatic section view on axis A-A of the FIG. 9 socket outlet;

FIG. 11 is a diagrammatic section view on axis C-C of the FIG. 9 socket outlet;

FIG. 15 is a diagrammatic view of an alternative embodiment of the electric plug in FIGS. 12 to 14;

FIG. 16 is a diagrammatic rear view in perspective of a socket outlet shown without its casing, in a variant of the socket-outlet example of Franco-Belgian standard of the first embodiment shown in FIG. 7;

FIG. 17 is a perspective view of a socket outlet and of an electric plug in accordance with the FIG. 3 embodiment, in accordance with the Franco-Belgian standard;

FIG. 21 is diagrammatic front view of the FIG. 20 socket outlet;

FIG. 22 is a diagrammatic section view on plane D-D of the FIG. 21 socket outlet;

FIG. 23 is an exploded diagrammatic view of a portion of the FIG. 20 socket outlet;

FIG. 25 is a diagrammatic front view of an example of a first embodiment socket outlet in accordance with the American standard;

FIG. 26 is a diagrammatic section view on plane E-E of the FIG. 25 socket outlet;

FIG. 28 is a partially cut-away diagrammatic perspective view of an electric plug that is suitable for co-operating with the FIG. 25 socket outlet; and FIG. 29 is a diagrammatic section view of the FIG. 28 plug.

Firstly, it should be observed that, from one figure to another, identical or similar elements of the various embodiments of the invention are, as far as possible, referenced using the same references or corresponding references, and they are not described each time.

Figure 7:
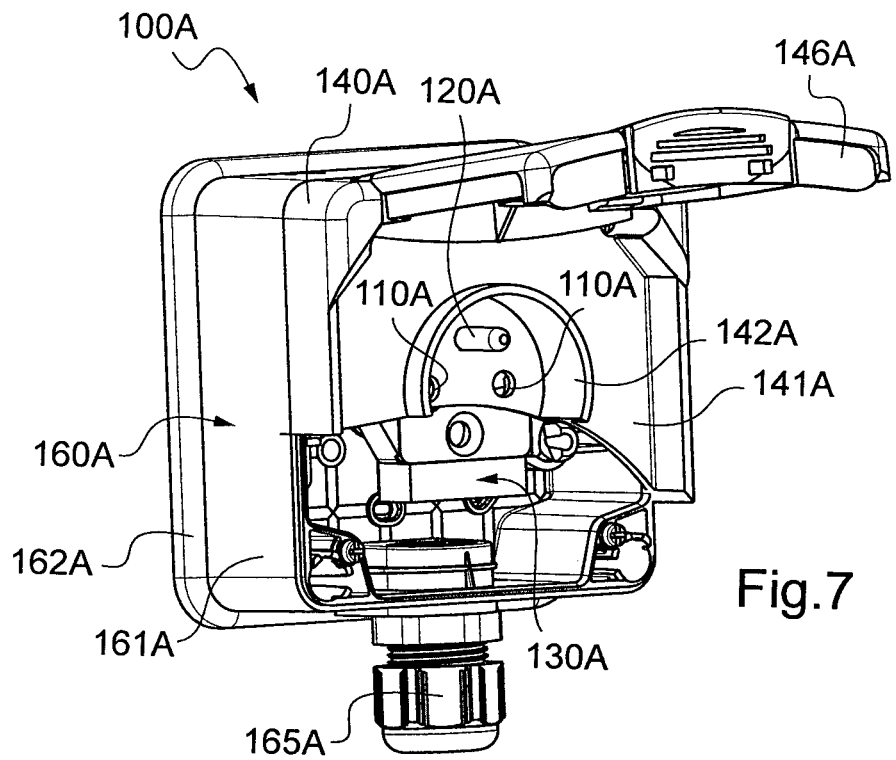
FIG. 7 is a diagrammatic front view in perspective of a socket-outlet example of Franco-Belgian standard in accordance with the first embodiment of the invention.

FIGS. 1 and 3 to 6 show, in the form of schematic diagrams, five embodiments of the electrical assembly E1; E2; E3; E4; E5 of the invention.

Each electrical assembly E1; E2; E3; E4; E5 comprises a socket outlet 100A; 100B; 100C; 100D; 300; 500; 700; 900 and an electric plug 200A; 200B, 200C; 200D; 400; 600; 800; 1000, each of the invention.

FIG. 2 shows the plug of the invention and a conventional socket outlet 10 that does not form part of the invention.

More particularly, FIGS. 1 and 3 to 11, 16 to 23, and 25 to 27 show several embodiments of the socket outlet of the invention.

FIGS. 12 to 15, 17, 18, 19, 24, 28, and 29 show several embodiments of the electric plug of the invention.

The socket outlet 100A; 100B; 100C; 100D; 300; 500; 700; 900 of the invention is adapted to deliver an electrical signal continuously without being damaged.

The electrical signal presents predetermined characteristics that depend on the physical characteristics intrinsic to the socket outlet and on the power supply to the socket outlet.

The electrical signal delivered by the socket outlet may be characterized by the delivered current in amps, by its voltage measured across the terminals of the socket outlet, or by the frequency in hertz of the alternating electrical signal, or by the power of the electrical signal. In particular, the characteristic may be any physical magnitude associated with the electrical signal delivered by the socket outlet.

The term "intrinsic characteristics of the socket outlet" means, in particular, the physical characteristics that determine how hot the socket outlet becomes and what temperature it can withstand while it is operating.

For example, the intrinsic characteristics of the socket outlet are its internal resistance, its shape, and the insulating and conductive materials that are used to manufacture it.

The maximum current that the socket outlet is adapted to deliver depends, in particular, on the intrinsic characteristics of the socket outlet.

The term "maximum current" means the maximum current of the electrical signal that the socket outlet can deliver for a determined time without being damaged. During this determined time, the socket outlet delivers the electric current continuously. For charging a motor vehicle, the determined time corresponds at least to the usual duration for charging a motor vehicle battery, which duration may lie in the range 4 hours (h) to 24 h.

Naturally, it is possible to provide interrupter means for interrupting the electric current in said socket outlet.

In remarkable manner, in the invention, the socket outlet 100A; 100B; 100C; 100D; 300; 500; 700; 900 includes identification means 130A; 130B; 130C; 130D; 330; 530; 730; 930 that are adapted to communicate or to co-operate with the electric plug 200A; 200B; 200C; 200D; 400; 600; 800; 1000 so as to supply said plug with a pilot signal that is representative of the maximum current that the socket outlet is adapted to deliver without being damaged.

The pilot signal thus depends on the intrinsic characteristics of the socket outlet that determine the maximum current.

It may also depend on the current delivered at a given instant, on the voltage across the terminals of the socket outlet, on the frequency of the alternating electrical signal, or on the power of the electrical signal.

Thus, the socket outlet of the invention is adapted to forward to the electric plug plugged therein, a pilot signal that informs said plug about the maximum current that can be delivered by said socket outlet, without the socket outlet being damaged. The electric plug of the invention is adapted to communicate with the socket outlet so as to receive or to generate the pilot signal, and to forward it to the electrical appliance that is connected to the electric plug.

The electrical appliance may thus be programmed so as to adapt its operation as a function of the pilot signal issued by the socket outlet.

The socket outlet of the invention more particularly presents intrinsic characteristics that are adapted to passing a current of not more than 16 A on a continuous basis, this value thus constituting the maximum current that can be delivered by the socket outlet.

By way of example, the electrical appliance connected to the electric plug of the invention may be an electric motor vehicle.

In particular, the socket outlet is a socket outlet that is dedicated to charging a battery of an electric motor vehicle. In particular, the socket outlet of the invention is adapted to deliver a charging current that is equal to 14 A.

In this embodiment, the pilot signal thus informs the electric plug plugged into the socket outlet that the socket outlet does indeed present the intrinsic characteristics necessary for charging the battery of the motor vehicle with this charging current of 14 A.

In other words, the socket outlet communicates with the electric plug so as to issue a pilot signal to the electric plug that said plug may thus forward directly to the electric motor vehicle, which signal indicates the maximum value of the current that the socket outlet can deliver without being damaged.

The electric vehicle can then adjust the value of the current that the battery of the vehicle may draw from the socket outlet for charging purposes, in order to avoid exceeding the maximum-current value.

In practice, the pilot signal is a binary signal: the presence of a pilot signal issued by the socket outlet indicates that the socket outlet is adapted to supply a high current of up to 16 A.

The absence of a forwarded pilot signal or a pilot signal equal to zero indicates that the socket outlet is a standard socket outlet that is not certain to be capable of delivering current that is greater than 8 A without being damaged.

Thus, when the electric plug of the battery of the electric vehicle forwards a pilot signal indicating that the socket outlet is adapted to deliver a current of 16 A, the battery is charged under optimized conditions and the battery of the vehicle draws a charging current of 14 A for the usual charging duration.

If the electric plug that connects the battery of the electric vehicle to the socket outlet forwards a pilot signal indicating that the socket outlet is not certain to be capable of delivering a current of 16 A, then the battery of the vehicle draws a current that is less than 16 A, e.g. equal to 8 A, for a duration that is longer than the usual charging duration, so as to charge the battery, without damaging the socket outlet.

The vehicle can thus optimize its charging time as a function of the socket outlet to which it is connected, without putting the installation in danger.

To this end, in practice, the electric plug 200A; 200B; 200C; 200D; 400; 600; 800; 1000 is adapted to be plugged into the socket outlet 100A; 100B; 100C; 100D; 300; 500; 700; 900 and includes reader means 230A; 230B; 230C; 230D; 430; 630; 830; 1030 that are adapted to communicate with the identification means 130A; 130B; 130C; 130D; 330; 530; 730; 930 of the socket outlet and to forward said pilot signal.

Various embodiments of the socket outlet and electric plug pair may be envisaged.

In a preferred first embodiment of the socket outlet 100A; 100B; 100C; 100D of the invention, shown diagrammatically in FIG. 1 and more precisely in FIGS. 7 to 11, 16, 20 to 23, and 25 to 27, said identification means 130A; 130B; 130C; 130D of the socket outlet comprise at least one magnet 133A; 133B; 133C; 133D.

Figure 27:
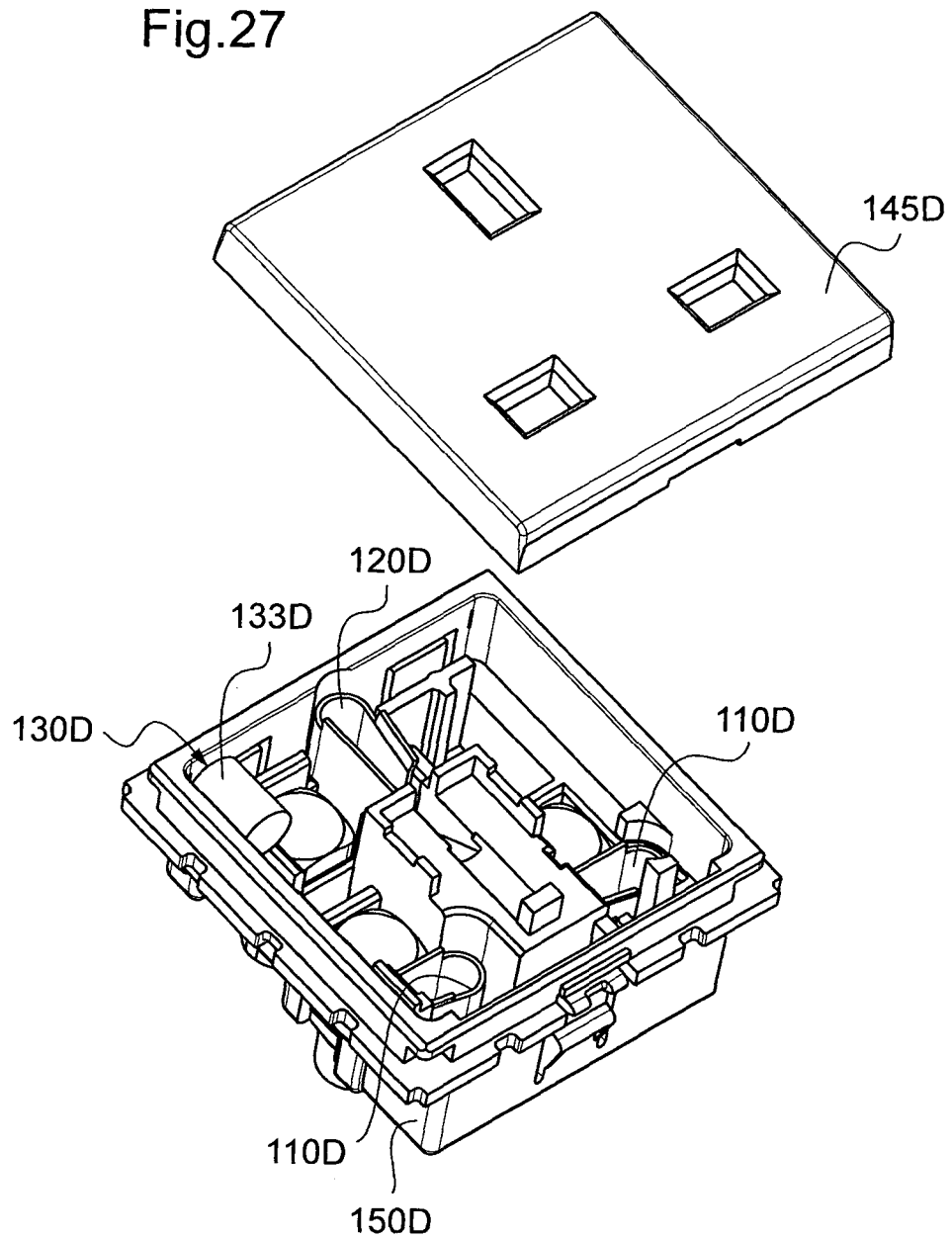
FIG. 27 is an exploded diagrammatic view of a portion of the FIG. 25 socket outlet.

FIGS. 7 to 11 and 16 show two examples of such a socket outlet in accordance with the Franco-Belgian standard, in particular standard NF C 61-314. FIGS. 20 to 23 show an example of such a socket outlet in accordance with the German standard DIN 49440, and FIGS. 25 to 27 show an example of such a socket outlet in accordance with the standard UL ANSI/NEMA WD6.

The magnet 133A; 133B; 133C; 133D produces a magnetic field that constitutes the pilot signal of the socket outlet 100A; 100B; 100C; 100D. In this embodiment, the identification means are thus active means. In this embodiment, the identification means are a permanent magnet.

Furthermore, the socket outlets shown in FIGS. 7 to 11, 16, and 25 to 27 include only one magnet. However, it is possible to envisage using a plurality of magnets in each of the socket-outlet examples. The socket-outlet example shown in FIGS. 20 to 23 includes two magnets for example, as described in greater detail below.

The socket outlet 100A; 100B; 100C; 100D comprises an equipment mechanism 150A; 150B; 150C; 150D and a trim cover 140A; 140B; 140C; 140D that is fitted on the front face of the equipment mechanism 150 A; 150B; 150C; 150D.

The rear face of the socket outlet 100A; 100C; 100D is closed by a casing 160A; 160C; 160D shown in FIGS. 7, 9 to 11, 20 to 22, and 25, 26. The casing of the FIG. 16 socket outlet is not shown, but is similar to the casing in FIGS. 9 to 11.

In this embodiment, the socket outlet 100A; 100B; 100C; 100D is for surface mounting on a reception wall. In a variant, it is also possible to envisage that the socket outlet is flush mounted in the reception wall.

Figure 8:
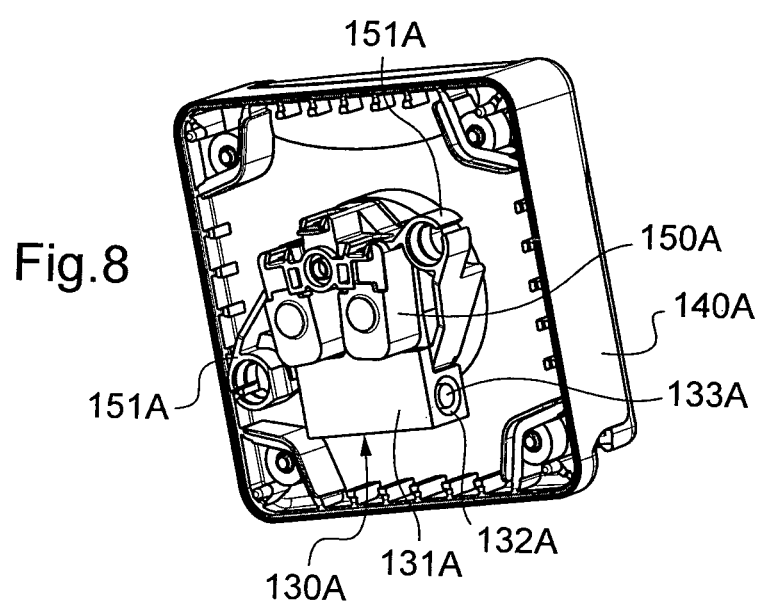
FIG. 8 is a diagrammatic rear view in perspective of the FIG. 7 socket outlet without its casing.

In the embodiment shown in FIGS. 7 to 11, the equipment mechanism 150A includes a base made of insulating material that is mounted in the casing by means of tabs 151A, forming respective reception wells that are adapted to receive respective complementary mounting lugs that are provided in the casing (FIG. 8).

Figure 20:
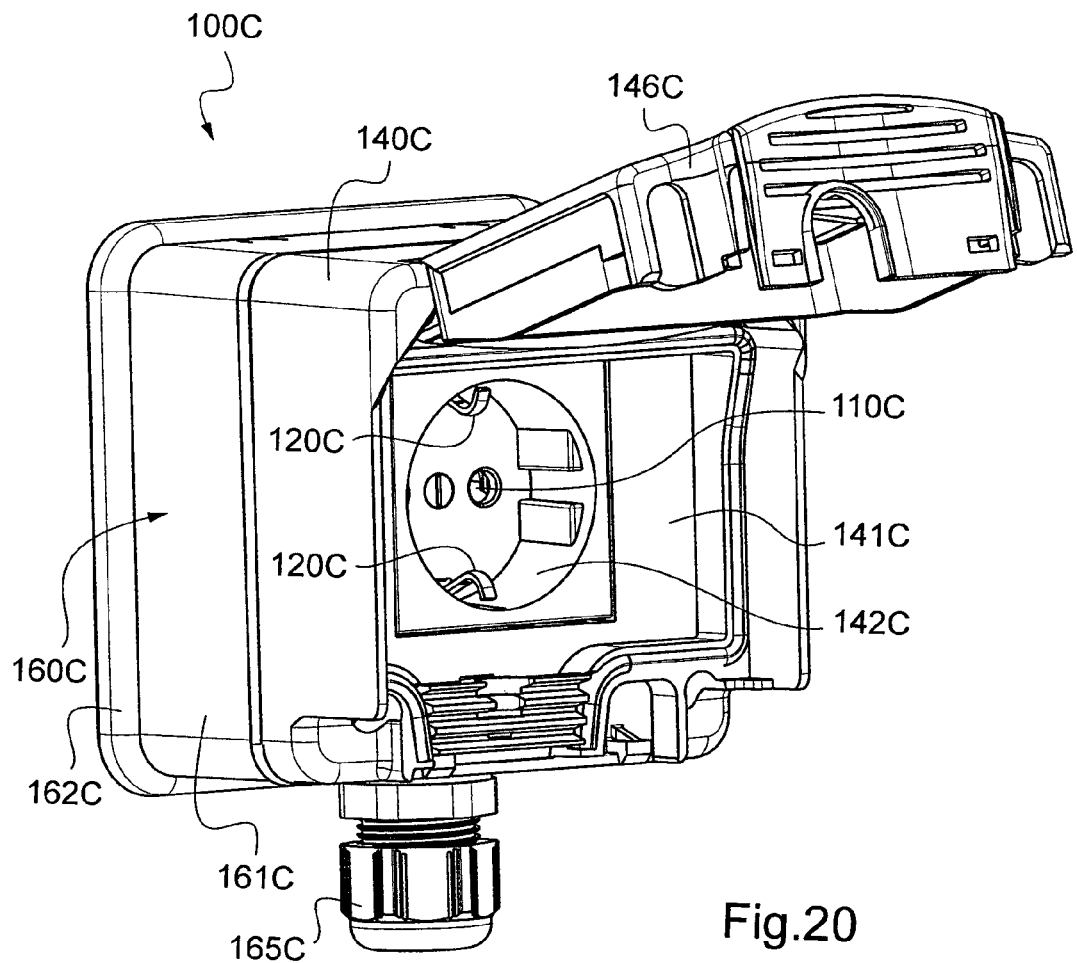
FIG. 20 is a diagrammatic front view in perspective of an example of a first embodiment socket outlet in accordance with the German "schuko" standard.

In the socket outlets 100A; 100B; 100C in FIGS. 7 to 11, 16, and 20 to 23 that are in accordance with the Franco-Belgian standards, trim 142A; 142B; 142C that forms the reception wells of the socket outlet 100A; 100B; 100C is fitted on the front of the base of the equipment mechanism and emerges from a front face 141A; 141B; 141C of the trim cover 140A; 140B; 140C (FIGS. 7, 16, and 20).

In the socket outlet 100D in FIGS. 25 to 27, in accordance with the UL standard, a plane trim plate 145D including, as explained below, access openings for accessing the terminals of the socket outlet, is fitted on the front of the base of the equipment mechanism and extends substantially in the plane of a front face 141D of the trim cover 140D (FIGS. 25 and 26).

Regardless of the standard of the socket outlet, in this embodiment the trim cover 140A; 140B; 140C; 140D further includes a flap 146A; 146B; 146C; 146D that is pivotally mounted on the front face of the trim cover 140A; 140B; 140C; 140D, so as to close the access to the reception wells of the socket outlets 100A; 100B; 100C of Franco-Belgian and German standard, or so as to close the access to the openings in the trim plate 145D of the socket outlet 100D in accordance with the UL standard.

The casing 160A; 160C; 160D includes a rear wall 163A; 163C; 163D that is surrounded by four side walls 161A; 161C; 161D that extend perpendicularly to the rear wall 163A; 163C; 163D (FIGS. 10, 11, 22, and 26).

The front face of the casing 160A; 160C; 160D is closed by the trim cover 140A; 140C; 140D. The rear wall 163A; 163C; 163D is surrounded by a flexible rim 162A; 162C; 162D that acts as a sealing gasket between the socket outlet 100A; 100C; 100D and the reception wall from which it projects.

In the socket-outlet example shown in FIGS. 10 and 11, one of the side faces 161A of the casing 160A includes a circular opening 164A into which a compression gland 165A is inserted, via which the electric power wires (not shown) of the socket outlet 100A penetrate into the casing 160A. Similar circular openings are provided in the casings 160C; 160D of the socket-outlet examples shown in FIGS. 21, 22 and 25, 26. They receive the compression glades 165C; 165D.

The casing of the socket outlet in FIG. 16 is similar to the casing 160A in FIGS. 10 and 11, and the trim cover 140B thus closes the front face of the casing.

In conventional manner, the base of the equipment mechanism 150A; 150B; 150C; 150D supports terminals that are adapted to be connected electrically to said line, neutral, and earth wires of the socket outlet 100A; 100B; 100C; 100D.

For socket outlets in accordance with the Franco-Belgian standard (FIGS. 7 to 11 and 16), a pin 120A that is connected to the earth terminal projects into the reception well of the socket outlet.

For the socket outlet in accordance with the German standard (FIGS. 20 to 23), two spring contacts 120C that are connected to the earth terminal project into the reception well of the socket outlet, along the side wall of the well.

For the socket outlet 100D in accordance with the UL standard (FIGS. 25 and 26), a cell 120D that is connected to an earth terminal is accessible through an opening that is formed in the trim plate 145D of the socket outlet 100D.

Regardless of the standard under consideration, two openings that are formed in the rear wall of the reception well of the socket outlet 100A; 100B; 100C or in the trim plate 145D of the socket outlet 100D, give access to cells 110A; 110C; 110D that are connected to the line and neutral terminals of the socket outlet 100A; 100B; 100C; 100D.

When the electrical terminals are connected, the socket outlet 100A; 100B; 100C; 100D delivers the electrical signal continuously without being damaged.

In the first embodiment shown in FIG. 1, the identification means 130A; 130B; 130C; 130D comprises the magnet(s) 133A; 133B; 133C; 133D and a support 131A; 131B; 131C; 131D that includes one or more housings 132A; 132B; 132C; 132D that receive the magnet(s) 133A; 133B; 133C; 133D (FIGS. 10, 16, 22, and 26).

In general, the magnet(s) 133A; 133B; 133C; 133D is/are arranged in the socket outlet 100A; 100B; 100C; 100D in such a manner that the magnetic field issued by the magnet(s) 133A; 133B; 133C; 133D presents a given minimum value in a region of the determined space situated in the front face of the corresponding socket outlet.

Thus, the socket outlet 100A; 100B; 100C; 100D can communicate with various different electric plugs plugged therein. The electric plug used may possess reader means that could be situated at various locations of the plug.

The magnetic field also presents a desired maximum value in another region of the determined space situated in the front face and/or around the socket outlet, so that the magnetic field issued by the magnet(s) 133A; 133B; 133C; 133D contained in the socket outlet 100A; 100B; 100C; 100D does not disrupt other electrical equipment situated nearby, e.g. another socket outlet.

Thus, as a general rule, it is preferable to position the magnet(s) 133A; 133B; 133C; 133D as close as possible to the front of the socket outlet: in this way, it is possible to obtain a magnetic field that is strong enough at the location where the electric plug is plugged into the socket outlet, and weak enough outside the socket outlet to prevent the disruption of the operation of other neighboring electrical equipment.

In the two socket-outlet examples 100A; 100B in accordance with the Franco-Belgian standard shown in FIGS. 7 to 11 and 16, the position of the magnet 133A; 133B and the characteristics of its magnetic field are determined so that the magnetic field issued by the magnet 133A; 133B presents the above-described characteristics.

The characteristics are determined in a precise region R of the space, defined as follows.

The region R of the space, shown by dashed lines and hatching in FIGS. 9 and 10, is a region of cylindrical shape, of diameter equal to 4.8 millimeters (mm). The axis of the cylindrical region R is situated at a distance D1, equal to 7.7 mm, from a plane that contains the axis of the pin 120A that is connected to the earth terminal of the socket outlet, and that is perpendicular to the plane that passes via the centers of the openings in the rear wall of the reception well that give access to the cells 110A that are connected to the line and neutral terminals of the socket outlet 100A.

The axis of the cylindrical region R of interest is also situated at a distance D2, equal to 9.9 mm, from the plane that contains the centers of the openings in the rear wall of the reception well that give access to the cells 110A that are connected to the line and neutral terminals of the socket outlet 100A.

An identical region may be defined for the FIG. 16 socket outlet 100B of the same standard.

In the cylindrical region R, at the rear wall of the reception well of the socket outlet 100A; 100B, the magnetic field issued by the magnet 133A; 133B of the socket outlet 100A; 100B is greater than a first threshold value equal to 14 millitesla (mT).

In the cylindrical region R, at a distance H1 equal to 15 mm from the rear wall of the reception well of the socket outlet 100A; 100B, the magnetic field issued by the magnet 133A; 133B of the socket outlet 100A; 100B is greater than a second threshold value equal to 2 mT. The distance of 15 mm from the rear wall of the reception well of the socket outlet corresponds to the position of the free edge of the reception well in the socket outlet 100 in accordance with the Franco-Belgian standard.

Finally, in the cylindrical region R, at a distance H2 equal to 21 mm from the rear wall of the reception well of the socket outlet 100A; 100B, the magnetic field issued by the magnet 133A; 133B of the socket outlet 100A; 100B is less than a second threshold value equal to 2 mT.

In the socket outlet 100A shown in FIGS. 7 to 11, the support 131A is constituted by an L-shaped part having one branch that forms said housing 132A and its other branch includes mounting means for mounting on the base of the equipment mechanism 150A, e.g. by screw-fastening or by crimping.

In a variant, the support may be mounted on the casing or the trim cover of the socket outlet. However, it is advantageous to secure the identification means of the socket outlet to the base of the equipment mechanism, so as to form an element that can be inserted into various socket-outlet casings.

It is thus possible to change the casing or the trim cover of the socket outlet without it being necessary to remove the identification means and then put them back into place.

Advantageously, the housing 132A is in the form of a cylindrical cavity, and the magnet 133A is in the form of a bar that is slid into the housing 132A.

By way of example, the magnet 133A presents a length of 25.4 mm, a diameter of 6.35 mm, and an adherence force of 1.6 kilograms (kg).

The magnet may be a permanent magnet having magnetization that is characterized by reference N42, which means that the energy density of the magnet 133A is 42 Mega Gauss Oersted (MGOe), and that it may be used up to an ambient temperature of 80 degrees Celsius (° C.).

Its coating is made of nickel, for example.

In this embodiment, the magnet 133A is arranged in the proximity of a wall of the reception well of the socket outlet 100A, so as to be close to the electric plug 200A when it is inserted into the reception well.

In this embodiment, the L-shape of the support 131A enables the magnet 133A to be held as close as possible to the rear wall of the reception well of the socket outlet 100A.

In this embodiment, the magnet 133A extends parallel to the rear wall of the reception well of the socket outlet 100A.

FIG. 16 shows a variant of the first embodiment in which only the support and the position of the magnet 133B are different.

Consequently, the strength of the magnet 133B, i.e. the characteristics of the magnetic field issued by the magnet 133B, is adjusted in such a manner that the intensity of the magnetic field in the regions of the above-defined space respects the above-mentioned conditions.

In the variant shown in FIG. 16, the support 131B of the magnet 133B comprises a cradle 1311 that is formed in the base of the equipment mechanism 150B, and a sleeve 1312 that projects from the rear face of the trim cover 140B.

The cradle 1311 and the sleeve 1312 each receive one end of the magnet 133B that extends along the axis of the reception well of the socket outlet 100B, perpendicularly to the rear wall of the reception well.

In this embodiment, the magnet 133B is close to the side wall of the reception well of the socket outlet 100B.

In the socket-outlet example 100C of the "schuko" type in accordance with the German standard shown in FIGS. 20 to 23, two magnets 133C are provided, as can be seen in FIGS. 22 and 23.

The presence of the two magnets 133C advantageously enables the socket outlet 100C to communicate with the corresponding electric plug 200C described below, regardless of the direction in which the electric plug is inserted into the socket outlet.

The configuration of the "schuko" type socket outlet 100C is such that it allows a plug to be inserted into its well in two orientations that are at 180 degrees to each other about the central axis of the well of the socket outlet.

In this configuration, the positions of the magnets 133C and the characteristics of their magnetic fields are determined such that the magnetic fields issued by the magnets 133C present the above-described characteristics.

The characteristics are determined in two precise regions R1 and R2 of the space, defined as follows.

The regions R1 and R2 of the space, shown by dashed lines and hatching in FIGS. 21 and 22, are two regions of cylindrical shape, of diameter equal to 4.8 mm. The axes of the regions R1 and R2 are spaced apart by a distance D3, equal to 19.8 mm, along a direction that is perpendicular to a plane PC that passes via the centers of the openings in the rear wall of the reception well that give access to the cells 110C that are connected to the line and neutral terminals of the socket outlet 100C, and that are spaced apart by a distance D4, equal to 15.4 mm, along a direction that is parallel to the plane PC that passes via the centers of the openings in the rear wall of the reception well that give access to the cells 110C that are connected to the line and neutral terminals of the socket outlet 100C. The plane containing the two axes of the regions R1 and R2 contains a central axis AC of the socket outlet 100C defined by the intersection of the above-defined plane PC and of a plane of symmetry PS of the spring contacts 120C that are connected to the earth terminal.

In other words, the two axes are symmetrical about a point that is situated on the central axis AC.

In each of the cylindrical regions R1, R2, at the rear wall of the reception well of the socket outlet 100C, the magnetic fields issued by the magnets 133C of the socket outlet 100C are greater than said first threshold value equal to 14 mT.

In each of the cylindrical regions R1, R2, at a distance H1 equal to 15 mm from the rear wall of the reception well of the socket outlet 100C, the magnetic fields issued by the magnets 133C of the socket outlet 100C are greater than said second threshold value equal to 2 mT.

Finally, in each of the cylindrical regions R1, R2, at a distance H2 equal to 21 mm from the rear wall of the reception well of the socket outlet 100C, the magnetic fields issued by the magnets 133C of the socket outlet 100C are less than said second threshold value equal to 2 mT.

In the embodiment shown in FIGS. 20 to 23, the support 131C of the magnets 133C is constituted by the base of the equipment mechanism 150C, in which two housings 132C are formed.

Each housing 132C is in the form of a cylindrical cavity, and the corresponding magnet 133C is in the form of a bar that is slid into the housing 132C.

In this embodiment, each magnet 133C extends perpendicularly to the rear wall of the reception well of the socket outlet 100C.

The two magnets 133C are arranged in the socket outlet 100C along directions that are symmetrical about the above-defined central axis AC of the socket outlet. They may be arranged at different distances behind the rear wall of the reception well of the socket outlet 100C. However, as above, they are preferably arranged as close as possible to the rear wall.

Finally, for the electric plug in accordance with the American standard in FIGS. 25 and 26, a single magnet 133D is provided having a support 131D that is constituted by the base of the equipment mechanism 150D, in which a housing 132D is formed.

The magnet 133D is in the form of a bar that is slid into the housing 132D, having an axis that, in this embodiment, extends parallel to the trim plate 145D that closes the equipment mechanism 150D. In this embodiment, the magnet 133D is held as close as possible to the trim plate 145D, in one of the corners of the base of the equipment mechanism 150D. In this embodiment, the magnet 133D is in contact with the inside face of the trim plate 145D and is oriented towards the inside of the equipment mechanism 150D.

The electric plugs 200A; 200B; 200C shown in FIGS. 12 to 15 and 24 are adapted to co-operate with the socket outlets 100A; 100B in accordance with the Franco-Belgian standard.

Figure 24:
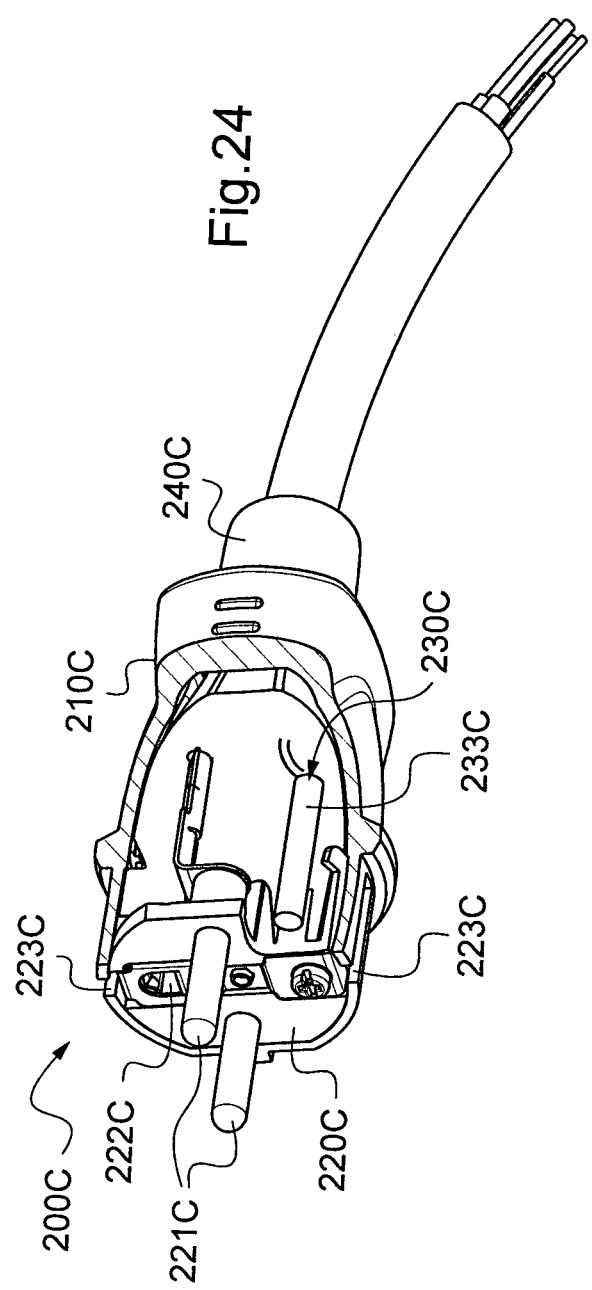
FIG. 24 is a partially cut-away diagrammatic perspective view of an electric plug that is suitable for co-operating with the FIG. 20 socket outlet.

The electric plug 200C shown in FIG. 24 is also adapted to co-operate with the socket outlet 100C in accordance with the German standard.

Finally, the electric plug 200D shown in FIGS. 28 and 29 is adapted to co-operate with the socket outlet 100D in accordance with the UL standard.

In conventional manner, each electric plug 200A; 200B; 200C; 200D comprises an insulating body 210A; 210C; 210D (not shown in FIG. 15) that houses two metal electrical-connection pins 221A; 221B; 221C; 221D that emerge from a front portion 220A; 220B; 220C; 220D of the body and that are adapted to be plugged into the cells 110A; 110C; 110D that are connected to the line and neutral terminals of the corresponding socket outlet.

The body 210A; 210C; 210D is made out of insulating material, e.g. by molding plastics material.

For each of the electric plugs 100A; 100B; 100C shown in FIGS. 12 to 15 and 24, said front portion 220A; 220B; 220C is in the form of a body that is circularly cylindrical around the longitudinal axis of said body and that is closed at the front by a front wall through which said pins 221A; 221B; 221C project along directions that are parallel to the longitudinal axis of the body 210A; 210C.

Said front portion 220A; 220B; 220C also includes a housing that opens out into the front wall via an opening. The housing houses a cell 222A; 222C that is adapted to receive the pin 120A of the Franco-Belgian standard socket outlet that is inserted through said opening so as to connect the electric plug 200A; 200B; 200C to earth.

The front portion 220C of the electric plug 200C, that is also adapted to co-operate with the socket outlet 100C in accordance with the German standard, further includes two diametrally-opposite grooves 223C that receive electrical contact elements that are adapted to co-operate with the spring contacts 120C of the socket outlet 100C that emerge on the side the reception well of the socket outlet for connecting the electric plug 200C to earth.

The body 210A; 210C of the electric plug 200A; 200C is extended at the rear by a rear element 240A; 240C for passing the electric wires that connect the electric plug 200A; 200C to an electrical appliance (not shown).

For the electric plug 200D shown in FIGS. 28 and 29, the body 210D of the electric plug 200D presents a shape that is generally rectangular.

The front portion 220D is in the form of a plate that closes a rectangular rear portion 240D through which the electric wires that connect the electric plug 200D to an electrical appliance (not shown) pass.

The front portion 220D of the electric plug 200D, that is adapted to co-operate with the socket outlet 100D in accordance with the American standard, includes three openings through which three pins 221D, 222D project, which pins are adapted to be plugged into the cells 110D, 120D that are connected to the corresponding terminals of the socket outlet 100D.

The three pins 221D, 222D extend along directions that are perpendicular to the plane of the front portion 220D.

Figure 12:
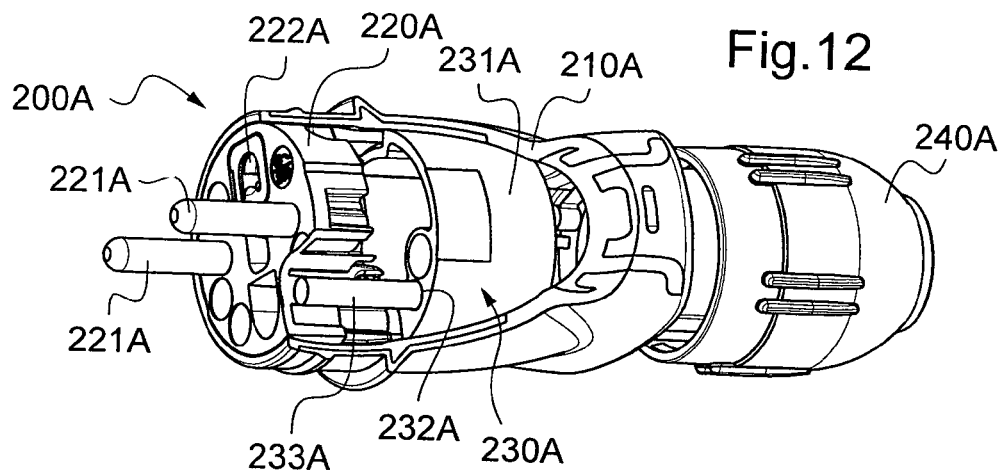
FIG. 12 is a diagrammatic front view in perspective of an electric plug that is suitable for co-operating with the FIG. 7 socket outlet, with a front portion of the electric plug shown cut away in part.
Figure 13:
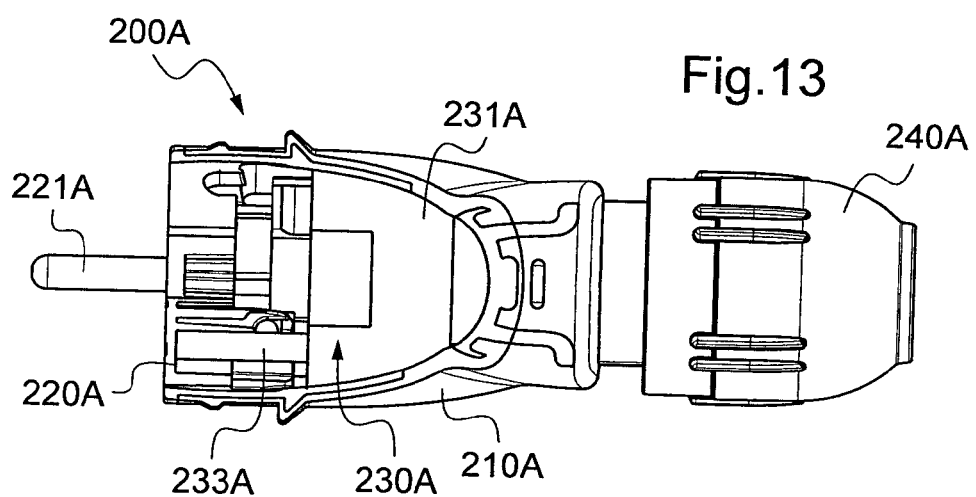
FIG. 13 is a diagrammatic side view of the FIG. 12 electric plug, with a front portion of the electric plug shown cut away in part.
Figure 14:
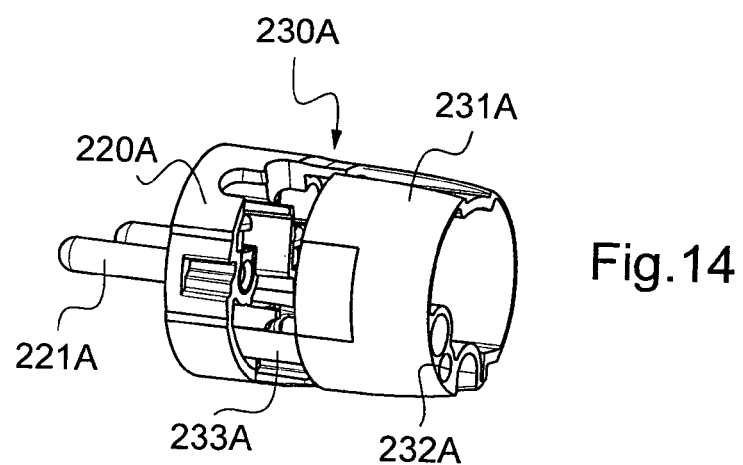
FIG. 14 is a diagrammatic perspective view of an inner portion of the electric plug in FIGS. 12 and 13.

The reader means 230A of the electric plug 200A shown in FIGS. 12 to 14 comprise: an annular support 231A through which said electric wires of the electric plug 200A pass; and a reed switch 233A that is mounted on the annular support 231A. They also comprise a secondary electrical circuit that is connected to the reed switch 233A.

In this embodiment, the term "secondary electrical circuit" means an electrical circuit of the electric plug that is distinct from the main electrical circuit that connects the pins of the electric plug to the corresponding electrical appliance.

The secondary electrical circuit may be an electrical circuit that is connected to the inlet and the outlet of the reed switch 233A and to the electrical appliance, i.e. in this embodiment to the motor vehicle, or to a voltage or current detector of any type that is capable of detecting current passing through the reed switch 233A.

The secondary circuit may also be connected firstly between one end of the reed switch 233A and the electrical appliance, and secondly between the other end of the reed switch and the cell 222A that is connected to the earth terminal of the electric plug.

The annular support 231A replaces the cable clamp that is usually housed in the body 210A, at the rear of the front portion 220A.

The reed switch 233A has two contacts that are spaced apart in the absence of a magnetic field, and that come into contact with each other in the presence of a magnetic field acting in any direction. The two contacts are arranged in a glass tube that is filled with an inert gas that protects them against oxidation.

The interrupting capacity of the reed switch 233A corresponds to the maximum current that can be passed through it without damaging the contacts, and it lies in the range 1 milliamp (mA) to 4 A. The trigger time of the reed switch 233A, corresponding to the time taken by the contacts in order to come into contact with each other in the presence of a magnetic field, is about 0.5 milliseconds (ms).

In this embodiment, the reed switch 233A is housed, in part, in a housing 232A that is in the form of a cylindrical orifice that is formed in the annular support 231A (FIG. 14).

The cylindrical orifice extends longitudinally in the thickness of the annular support 231A.

A portion of the reed switch 233A projects from the annular support 231A, towards the front of the electric plug 200A (FIGS. 12 to 14).

In this embodiment, the reed switch 233A extends parallel to the axis of the terminals 221A, i.e. parallel to the longitudinal axis of the body 210A of the electric plug 200A.

The free end of the first flexible-blade switch 233A is thus situated very close to the front wall of the front portion 220A of the electric plug 200A.

When the electric plug 200A is inserted into the socket outlet 100A; 100B, the front face of the front portion 220A of the electric plug 200A bears against the rear wall of the reception well of the socket outlet 100A; 100B, and thus the reed switch 233A is positioned in the proximity of the magnet 133A; 133B of the identification means 130A; 130B of the socket outlet 100A; 100B.

The reed switch 233A is thus immersed in the magnetic field produced by the magnet 133A; 133B of the socket outlet 100A; 100B and passes from its open position, in which its contacts are spaced apart, to a closed position in which its contacts are in contact, thereby allowing an electric current to flow through the secondary electrical circuit of the electric plug 200A.

The passage of a current in the secondary electrical circuit (not shown) makes it possible to forward to the electrical appliance connected to the electric plug 200A, the pilot signal that is determined as a function of the electrical signal delivered by the socket outlet 100A into which it is plugged. In this embodiment, the pilot signal indicates that the socket outlet is indeed adapted to deliver an electrical signal of maximum current equal to 16 A without being damaged.

In a variant, the reed switch may be arranged in some other way in the electric plug, but still in the proximity of the front face of the front portion of the electric plug.

The electric plug 200B shown in FIG. 15 constitutes a variant of the first embodiment of the electric plug that is adapted to co-operate with the socket outlets 100A; 100B in accordance with the Franco-Belgian standard.

In this variant, the reed switch 233B of the electric plug 200B is housed in an oblong sheath that is slid and held in a slot 236B that is formed in a front portion 220B of the body 210B of the electric plug 200B, parallel to the longitudinal axis of the electric plug. In this embodiment, the slot 236B is formed in a peripheral portion of the front portion 220B.

In this configuration, the support 231B of the reed switch 233B is constituted by the front portion 220B of the electric plug 200B. Moreover, in conventional manner, the electric plug 200B includes a cable clamp 225B that is arranged at the rear of the front portion 220B, in the body 210B.

The reader means 230C of the electric plug 200C shown in FIG. 24 and adapted to co-operate with the socket outlets of Franco-Belgian or German standard, and the means of holding the reader means 230C in the electric plug 200C (not shown in FIG. 24) may be similar in every way to those described with reference to FIGS. 12 to 15.

In this embodiment, the reader means are a reed switch 230C that is oriented parallel to the pins 221C of the electric plug 200C.

The reader means 230D of the electric plug 200D shown in FIGS. 28 and 29 and adapted to co-operate with the socket outlet of American standard are similar to the reader means described with reference to FIGS. 12 to 15. The reader means are a reed switch that is housed in the rear portion 240D of the electric plug. In this embodiment, the reed switch is arranged perpendicularly to the pins 221D of the electric plug 200D.

Regardless of the standard of the electric plug under consideration, it is also possible to envisage replacing the reed switch by a Hall-effect sensor. The Hall-effect sensor issues an electrical signal when it is immersed in a magnetic field. The electrical signal is thus issued when the Hall-effect sensor is brought up to the magnet of the socket outlet, which inevitably occurs when the electric plug is inserted into the socket outlet. The electrical signal issued by the Hall-effect sensor is thus forwarded by the secondary electrical circuit of the electric plug to the electrical appliance.

Advantageously, the electric plug 200A; 200B; 200C; 200D is entirely suitable for being used with a conventional socket outlet 10 (FIG. 2) of appropriate standard that does not include any identification means, or that includes identification means that are not compatible with the reader means of the plug.

As shown in FIG. 2, no pilot signal is thus forwarded to the electric plug, since the reader means of said plug do not detect any magnetic field.

Conversely, the socket outlet 100A; 100B; 100C; 100D of the invention is also adapted to receive conventional electric plugs that do not include reader means.

In a second embodiment shown in FIGS. 3 and 17, the socket outlet 300 includes active identification means 330 that issue a pilot signal in the form of a light.

In this embodiment, the identification means of the socket outlet 300 comprise a light source 330 that may be powered either by power that is independent of the power for powering the terminals of the socket outlet 300, or by tapping power from the power for powering the socket outlet 300.

By way of example, the light source is a light-emitting diode.

As shown in FIG. 17, like the socket outlet of the first embodiment, the socket outlet 300 includes a casing 360 that houses an equipment mechanism. The front face of the casing 360 is closed by a trim cover 340. Trim 342 is provided that emerges from the front face 341 of the trim cover 340 and that forms the reception well of the socket outlet 300, and a flap 346 is pivotally mounted on the trim cover 340 so as to close the access to the reception well of the socket outlet 300.

The light source 330 is housed in the casing 360, facing an opening 331 of the front face 341 of the trim cover 340.

In a variant, the light source emits light into a light guide, e.g. an optical fiber, that conveys the light beam emitted by the light source to an opening of the front face of the trim cover.

Still in a variant, the light beam emitted by the light source emerges via an opening that is situated in the rear wall of the reception well of the socket outlet.

In this embodiment, the electric plug 400 that is adapted to receive the pilot signal issued by the socket outlet 300 includes reader means 430 that comprise a light guide, specifically an optical fiber 432, and a light detector (not shown).

In addition and as above, the electric plug 400 includes a body 410 that is extended at its rear by a rear element 440 and that is closed at its front by a front portion 420 from which the connection terminals 421 of the electric plug 400 emerge (FIG. 17).

The optical fiber 432 opens out to the outside of the electric plug 400 at a location that, when the electric plug 300 is inserted into the socket outlet 400, is situated facing the opening 331 of the socket outlet 300 through which the light beam emitted by the light source 330 of the socket outlet 300 emerges.

In this embodiment, the optical fiber 432 extends into the electric plug 400 along the longitudinal axis of the body 410 of the electric plug with the corresponding electric power wires 450, and is then offset a small distance away from the longitudinal axis of the body: it passes through a projection 431 of the body 410 of the electric plug 400 and opens out onto a face of the projection 431 that bears against the front face 341 of the trim cover 340, facing the opening 331, when the electric plug 400 is inserted into the socket outlet 300.

In a variant, the optical fiber 432 may open out at any location of the outer surface of the electric plug, provided that the location is arranged facing the opening of the socket outlet via which the light beam emitted by the light source of the socket outlet emerges.

Thus, when the electric plug 400 is inserted into the socket outlet 300, the light beam emitted by the light source 330 of the socket outlet 300 penetrates into the optical fiber 432.

It is conveyed by the optical fiber 432 to a light detector that, in this embodiment, is located at a distance from the electric plug 400, in the electrical appliance.

In a variant, the light detector may also be housed in the insulating body of the electric plug itself.

The light detector thus issues an electrical signal that is sent to the electrical appliance that is connected to the socket outlet 300 via the electric plug 400.

The pilot signal issued by the socket outlet in the form of light is thus converted into a pilot signal in the form of electricity that, by way of example, indicates to the electrical appliance that the socket outlet is adapted to deliver a maximum current that is equal to 16 A.

In a variant, it is possible to envisage that the socket outlet includes a plurality of light sources that emit light as a function of the characteristics of the electrical signal delivered by the socket outlet at a given instant.

The complementary electric plug thus includes at least one light guide, and preferably as many light guides as there are light sources present in the socket outlet. The light guides convey the light beams emitted by the light sources to one or more light detectors.

It is thus possible to forward to the electrical appliance a variety of information relating to the electrical signal delivered by the socket outlet.

Figure 18:
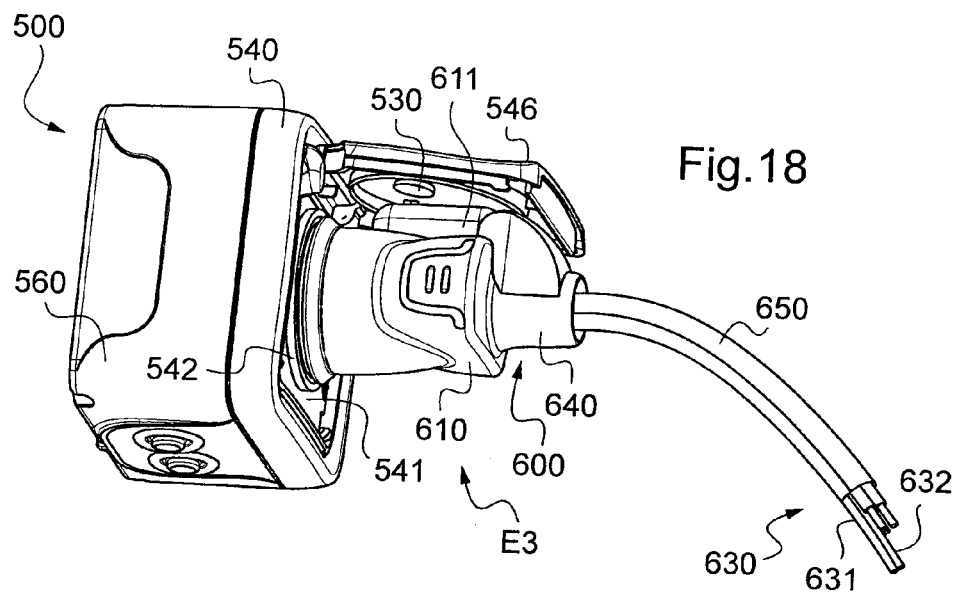
FIG. 18 is a perspective view of a socket outlet and of an electric plug in accordance with the FIG. 4 embodiment, in accordance with the Franco-Belgian standard.
Figure 19:
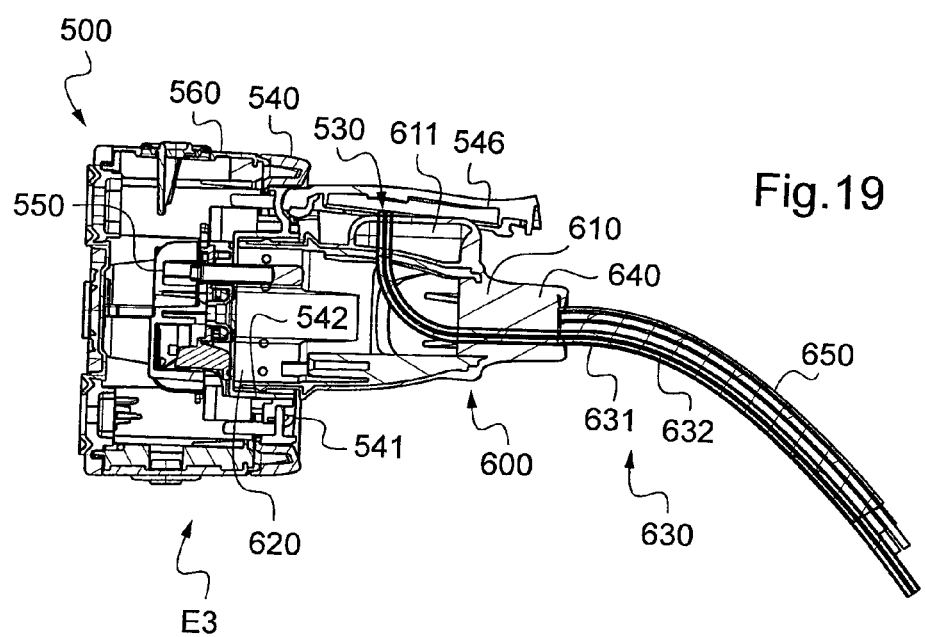
FIG. 19 is a longitudinal section view of the FIG. 18 socket outlet.

In a third embodiment shown in FIGS. 4, 18, and 19, the socket outlet 500 includes passive identification means 530.

The identification means comprise a light reflector 530, e.g. a mirror 530.

As shown in FIGS. 18 and 19, like the other socket outlets described above, the socket outlet 500 includes a casing 560 that houses an equipment mechanism 550 (FIG. 19). The front face of the casing 560 is closed by a trim cover 540. Trim 542 is provided that emerges from the front face 541 of the trim cover 540 and that forms the reception well of the socket outlet, and a flap 546 is pivotally mounted on the trim cover 540 so as to close the access to the reception well of the socket outlet 500.

In this embodiment, the mirror 530 is arranged, e.g. adhesively-bonded, on the inside face of the flap 546, oriented towards the reception well of the socket outlet 500 when the flap 546 is closed.

The mirror 530 is arranged such that it is adapted to reflect a light beam emitted by the complementary electric plug 600 towards a light detector of the electric plug.

More precisely, in this embodiment, the reader means 630 of the electric plug 600 that is adapted to co-operate with the socket outlet 500 include two light guides that are in the form of two optical fibers 631, 632, a light source (not shown), and a light detector (not shown).

As above, the electric plug 600 includes a body 610 that is closed at its front by a front portion 620 from which the connection terminals 621 of the electric plug emerge (FIG. 19).

In this embodiment, the optical fibers 631, 632 penetrate longitudinally into the body 610 of the electric plug 600 with the electric wires 650 that connect the electric plug 600 to the corresponding electrical appliance, through a rear portion 640 of the plug (FIG. 19).

They emerge sideways, through a boss 611 of the body 610 of the electric plug, which boss is situated beside the flap 546 when the electric plug 600 is inserted into the socket outlet 500.

The boss 611 makes it possible to hold one of the ends of each optical fiber 631, 632 in place, and to push back the flap 546 of the socket outlet 500.

Thus, the end of each optical fiber 631, 632 opens out facing the mirror 530.

The other end of one of the optical fibers 631 is connected to the light source (not shown), e.g. a light-emitting diode, while the other end of the other optical fiber 632 is connected to the light detector.

In this embodiment, the light source and the light detector are located outside the body of the electric plug, at the electrical appliance.

In a variant, it is possible to envisage that they are housed in the body of the electric plug.

When the electric plug 600 is inserted into the socket outlet 500, the flap 546 is pushed back by the boss 611 of the body 610 of the electric plug and is held by the boss 611 in a predetermined orientation relative to the electric plug 600.

The light beam from the optical fiber 631 that is connected to the light source is reflected by the mirror 530 and reaches the end of the other optical fiber 632.

In this embodiment, the pilot signal is the reflected light beam.

The reflected light beam is conveyed by the other optical fiber 632 to the light detector. The light detector thus converts the pilot signal in the form of light into a pilot signal in the form of electricity that is forwarded to the electrical appliance. By way of example, the electrical pilot signal indicates to the electrical appliance that it is certain that the socket outlet is adapted to deliver a maximum current equal to 16 A.

In a fourth embodiment shown in FIG. 5, said identification means of the socket outlet 700 comprise a pusher element 730, e.g. a rod, that projects from the front face of the trim cover or from the rear wall of the reception well of the socket outlet 700.

The identification means are thus passive means.

FIG. 5 represents the terminals 710, 720 of the socket outlet 700 diagrammatically.

In this embodiment, the reader means 830 of the complementary electric plug 800 comprise a secondary electrical circuit and a mechanical switch 831.

The pusher element 730 is adapted to actuate the mechanical switch 831 of the complementary electric plug 800 when said electric plug is inserted into the socket outlet. Preferably, the pusher element is a pusher element that does not conduct electricity.

FIG. 5 represents the terminals 821 of the electric plug 800 and the earth terminal 822 diagrammatically.

Actuating the mechanical switch 831 closes the secondary electrical circuit of the electric plug 800 and allows an electric current to pass into the secondary circuit.

The passage of the electric current forwards the pilot signal to the electric plug.

In a fifth embodiment shown in FIG. 6, said identification means of the socket outlet 900 comprise an electrical contact element 930, e.g. a metal plate, that is accessible at the front face of the trim cover or at the rear wall of the reception well of the socket outlet 900. The identification means are thus passive means.

By way of example, the metal plate 930 may be mounted inside the socket outlet and may be accessible through an opening of the trim cover or of the rear wall of the well, or it may be arranged on the outside of the socket outlet, e.g. adhesively-bonded to the front face of the trim cover or to the rear wall of the reception well of the socket outlet 900.

The metal plate 930 is not connected electrically to the power wires of the socket outlet 900.

FIG. 6 represents the terminals 910, 920 of the socket outlet 900 diagrammatically.

The reader means 1030 of the complementary electric plug 1000 comprise a secondary electrical circuit that is open across two metal rods 1031.

The metal plate 930 is adapted to establish electrical contact between the two metal rods 1031 of the complementary electric plug 1000 when said electric plug is inserted into the socket outlet 900.

The metal rods 1031 project from a front portion of the electric plug 1000, facing the metal plate 930.

In this way, the secondary electrical circuit of the electric plug 1000 is closed and an electric current flows through the secondary circuit. The passage of the electric current constitutes the pilot signal forwarded to the electric plug 1000.

FIG. 6 represents the terminals 1021 and the earth terminal 1022 of the electric plug 1000 diagrammatically.

The invention also relates to the electrical assembly comprising the socket outlet of the invention and its complementary electric plug.

The pilot signal enables the electric plug 200A; 200B; 200C; 200D; 400; 600; 800; 1000 to distinguish between the socket outlet 100A; 100B; 100C; 100D; 300; 500; 700; 900 and another socket outlet that delivers an electrical signal of different characteristics. For example, it makes it possible to distinguish a socket outlet that is indeed adapted to deliver a high-amperage electrical signal from a socket outlet having intrinsic characteristics that are not identified with certainty when the identification means are installed on a socket outlet having intrinsic characteristics that ensure that it is adapted to deliver a high-amperage current.

The electrical appliance may consequently adjust its operation, e.g. limiting the current it draws from the socket outlet in order to operate at the maximum current that the socket outlet can deliver without being damaged.

It is also possible to envisage combining more than one of the above-described embodiments, by providing different types of identification means on a single socket outlet, and one or more reader means on its associated electric plug.

The invention claimed is:

1. A socket outlet comprising:
   a casing;
   intrinsic characteristics so as to be suitable for delivering continuously, and without being damaged, an electrical signal that presents a determined maximum current; and
   identification means for communicating or co-operating with an electric plug so as to generate a pilot signal that is representative of said maximum current of said electrical signal that can be delivered by the socket outlet without being damaged, said identification means comprising a magnet, wherein the pilot signal is a magnetic field produced by said magnet.

2. The socket outlet according to claim 1, wherein said magnet is in the casing of the socket outlet adjacent to a wall of a reception well of the socket outlet.

3. The socket outlet according to claim 2, wherein said wall is a rear wall of the reception well.

4. The socket outlet according to claim 2, wherein said wall is a side wall of the reception well.

5. The socket outlet according to claim 1, further comprising an equipment mechanism and a trim cover.

6. The socket outlet according to claim 5, wherein a support for the magnet is mounted on a base of the equipment mechanism.

7. The socket outlet according to claim 6, wherein said support includes a housing and the magnet is a bar slid into the housing.

8. The socket outlet according to claim 6, wherein the base is mounted in a casing of the socket outlet.

9. The socket outlet according to claim 8, wherein a front face of the casing is closed by the trim cover.

10. The socket outlet according to claim 1, wherein an electrical appliance is connected to the electric plug and wherein the electric plug is plugged into the socket outlet, and wherein a current drawn by the electrical appliance is limited to the maximum current.

11. An electric plug that is adapted to be plugged into a socket outlet,
wherein the socket outlet comprises given intrinsic characteristics so as to be suitable for delivering continuously, and without being damaged, an electrical signal that presents a determined maximum current, and identification means comprising a magnet, said identification means for communicating or co-operating with the electric plug so as to generate a pilot signal that is representative of said maximum current of said electrical signal that can be delivered by the socket outlet without being damaged, said pilot signal being a magnetic field produced by said magnet and
wherein said electric plug comprises reader means for communicating with said identification means and forwarding said pilot signal.

12. The electric plug according to claim 11, wherein said reader means comprise a Hall-effect sensor.

13. The electric plug according to claim 11, wherein said reader means comprise a reed switch that is sensitive to magnetic fields.

14. The electric plug according to claim 13, wherein the reader means includes an annular support through which electric wires of the electric plug pass, and wherein the reed switch is mounted on the annular support.

15. The electric plug according to claim 13, wherein the reader means includes a secondary electrical circuit connected to an inlet and an outlet of the reed switch.

16. The electric plug according to claim 13, wherein the reader means includes a secondary electric circuit connected between a first end of the reed switch and an electrical appliance connected to the electric plug, and between a second end of the reed switch and a cell connected to an earth terminal of the electric plug.

17. An electrical assembly comprising:
a socket outlet; and
an electric plug that is adapted to be plugged into said socket outlet and that comprises a reader,
the socket outlet having given intrinsic characteristics so as to be suitable for delivering continuously, and without being damaged, an electrical signal that presents a determined maximum current,
said socket outlet comprising identification means for communicating or co-operating with said reader of the electric plug so as to generate a pilot signal that is representative of said maximum current of the electrical signal that can be delivered continuously by the socket outlet without being damaged,
said identification means comprising a magnet, wherein the pilot signal is a magnetic field produced by said magnet.

18. The electrical assembly according to claim 17, wherein said reader comprises a Hall-effect sensor that is adapted to forward said pilot signal when the electric plug is inserted into said socket outlet.

19. The electrical assembly according to claim 17, wherein said reader comprises a secondary electrical circuit including a reed switch that is sensitive to magnetic fields and adapted to change state when the electric plug is inserted into the socket outlet.

20. The electrical assembly according to claim 17, further including an electrical appliance programmed to operate as a function of the pilot signal.

21. The electrical assembly according to claim 20, wherein the electrical appliance is adapted to limit a current drawn from the electric plug to the maximum current represented by the pilot signal.

* * * * *